Aug. 30, 1960     G. R. ENGLUND ET AL     2,950,758
CASH REGISTERS, ACCOUNTING AND LIKE MACHINES
Filed March 9, 1956                    30 Sheets-Sheet 1

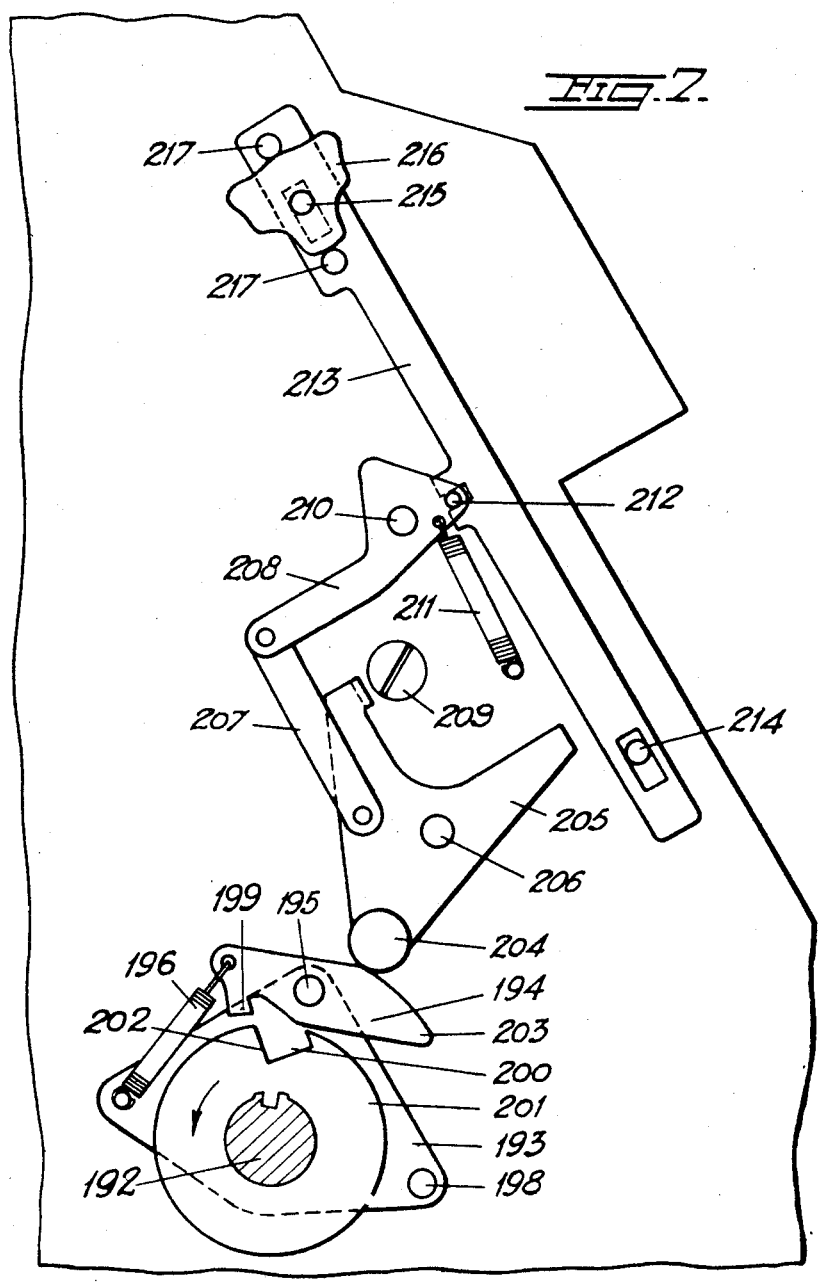

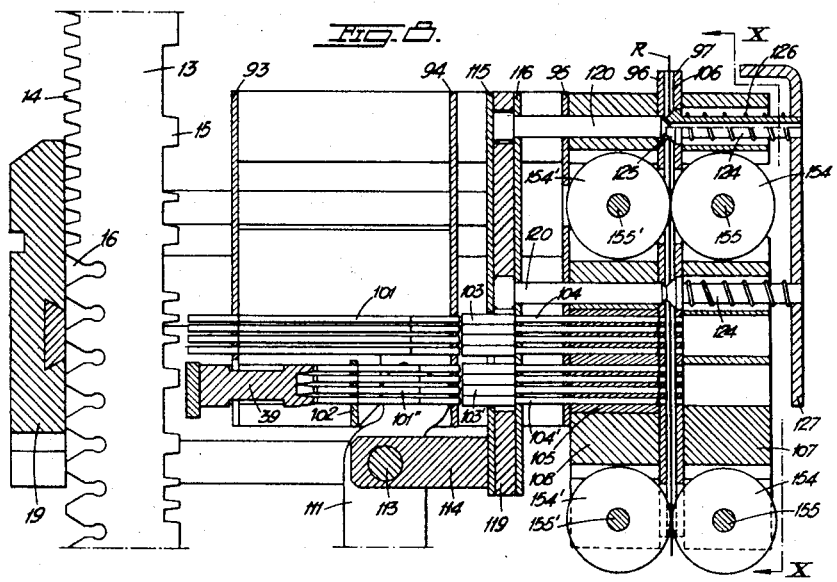

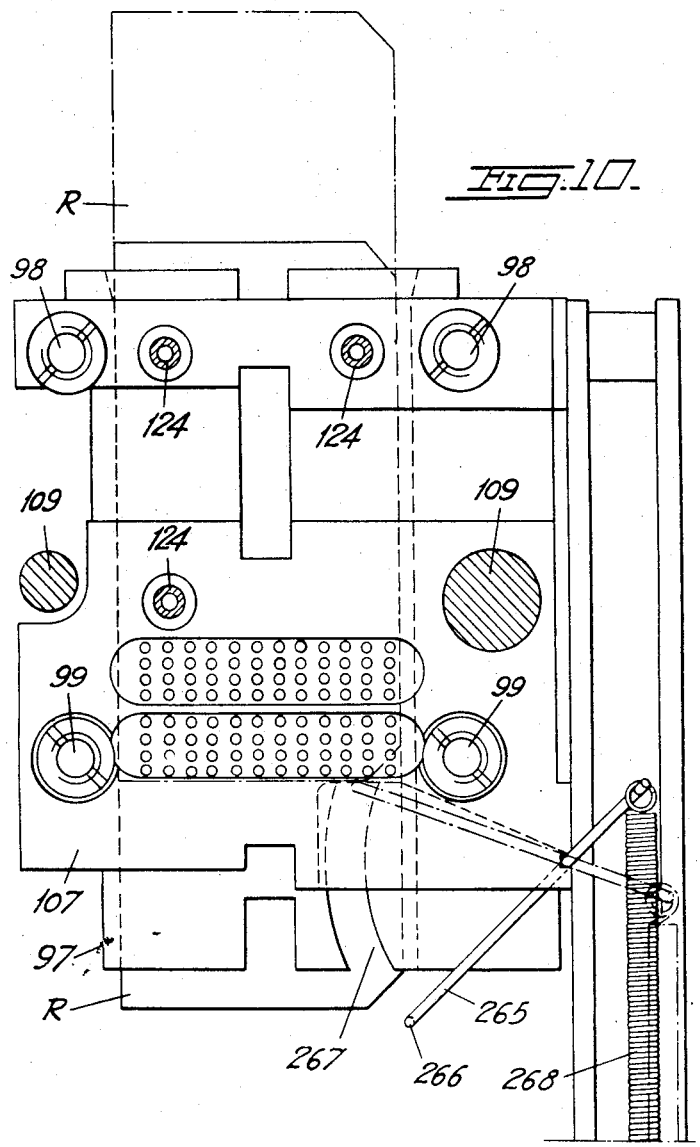

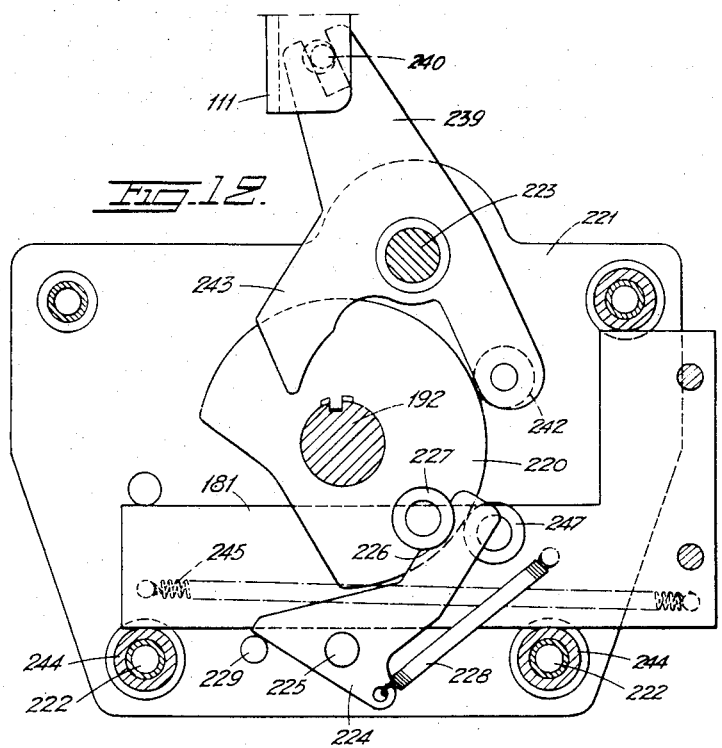
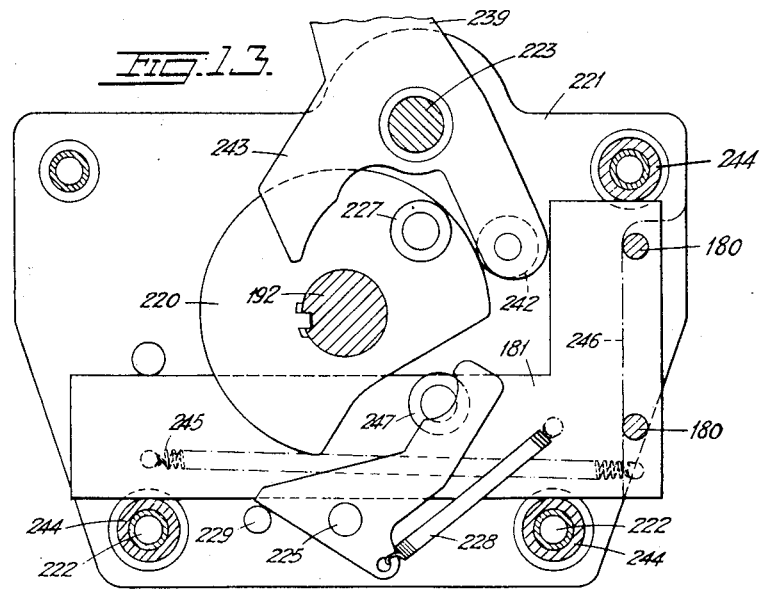

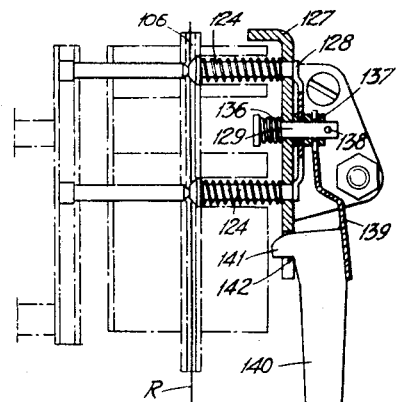
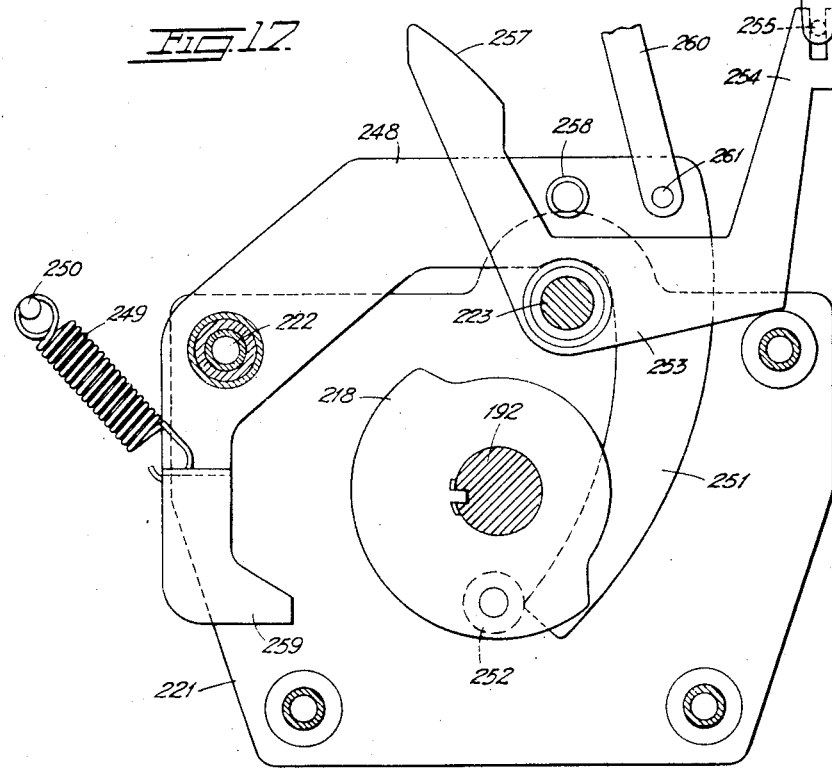
Fig. 17.

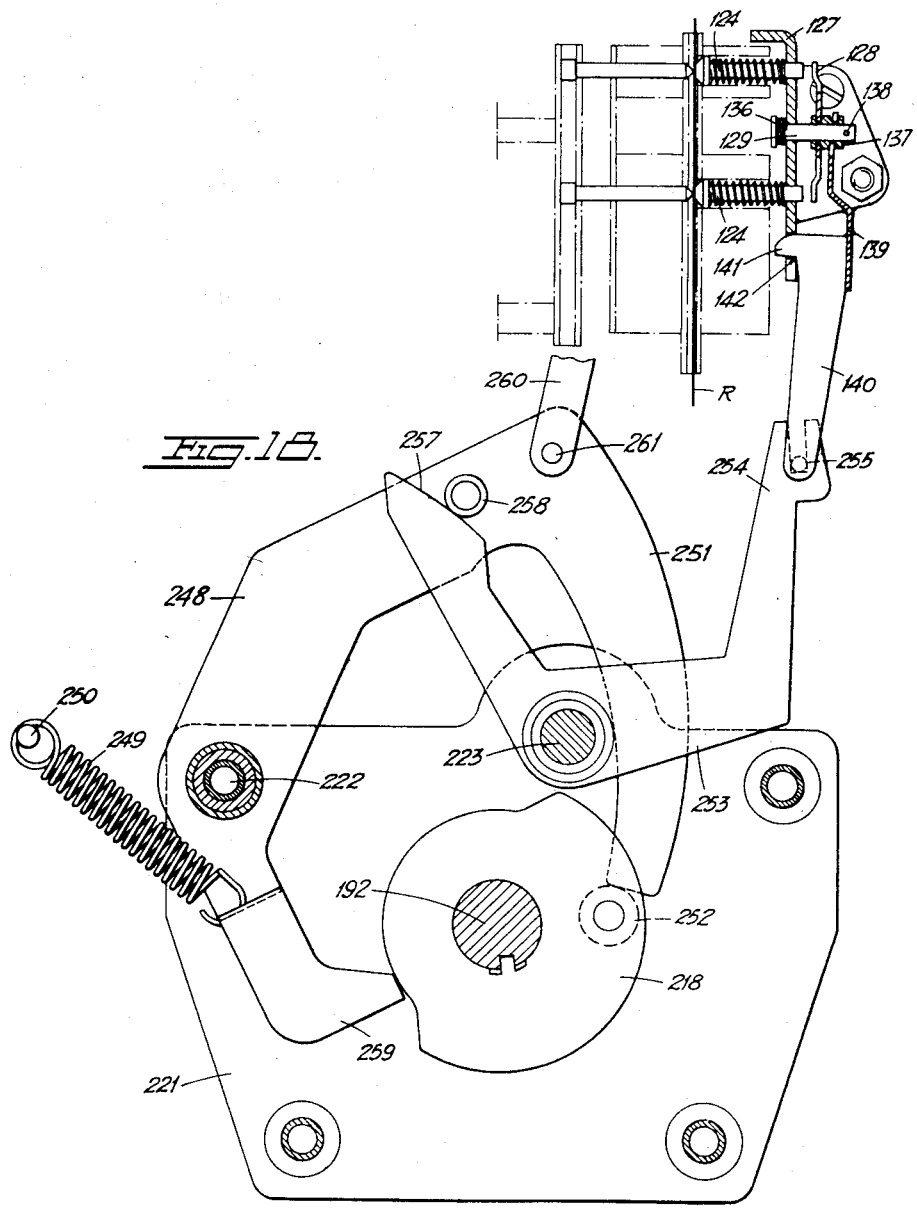

Aug. 30, 1960 G. R. ENGLUND ET AL 2,950,758
CASH REGISTERS, ACCOUNTING AND LIKE MACHINES
Filed March 9, 1956 30 Sheets-Sheet 17
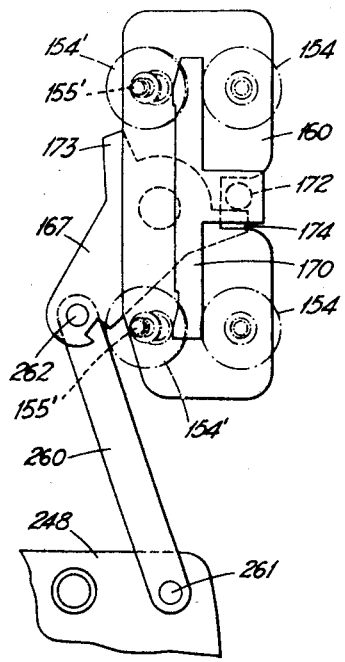
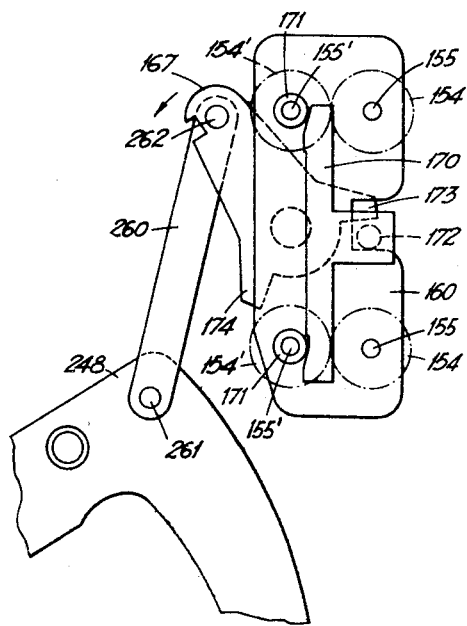

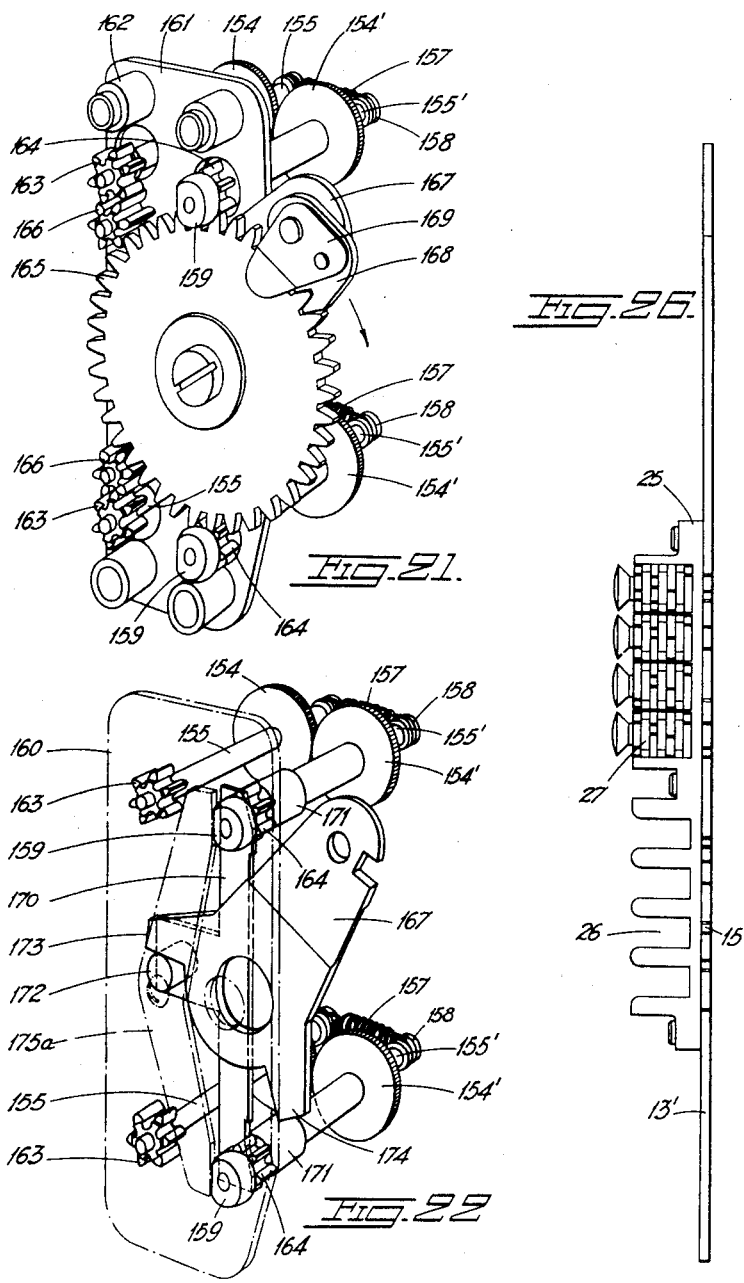

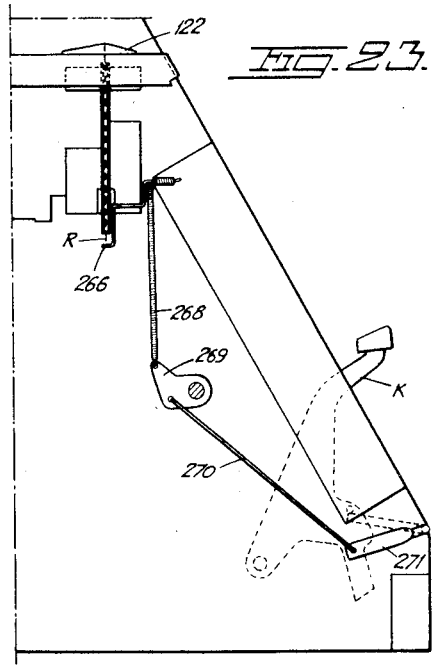
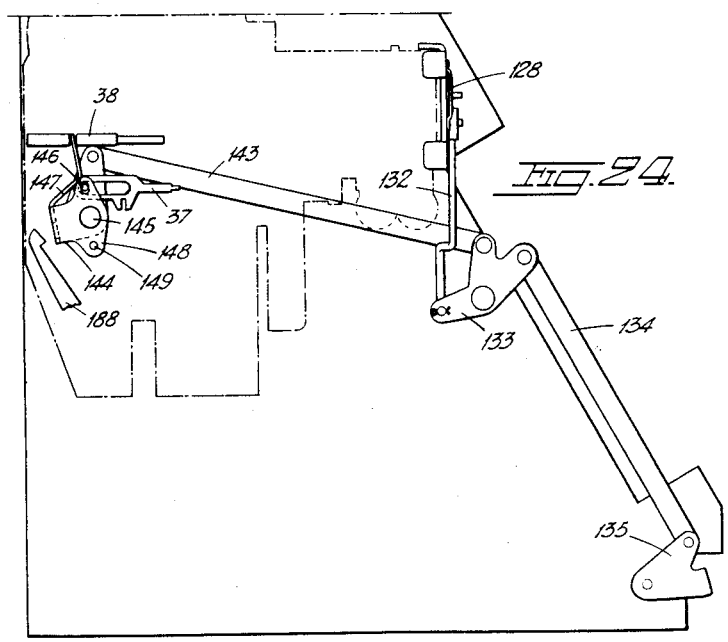

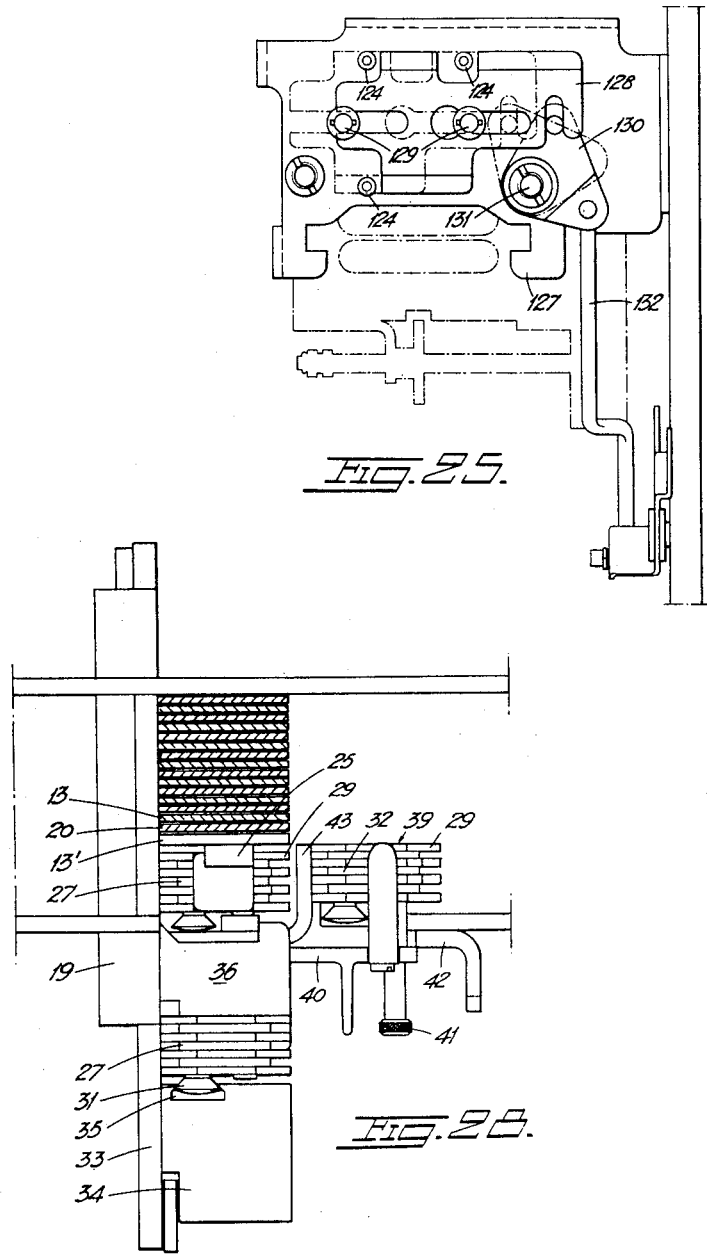

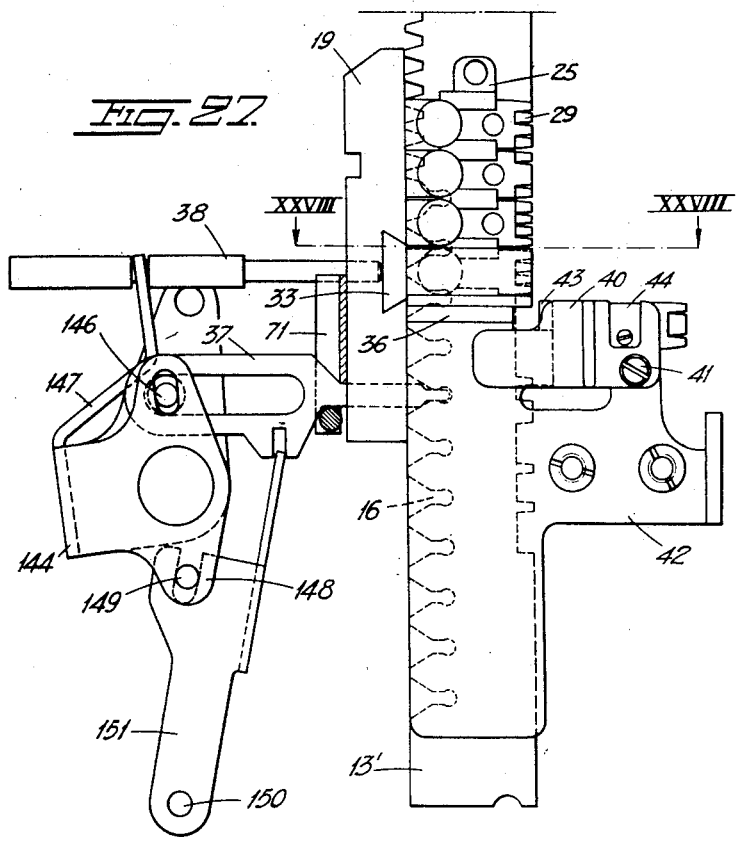

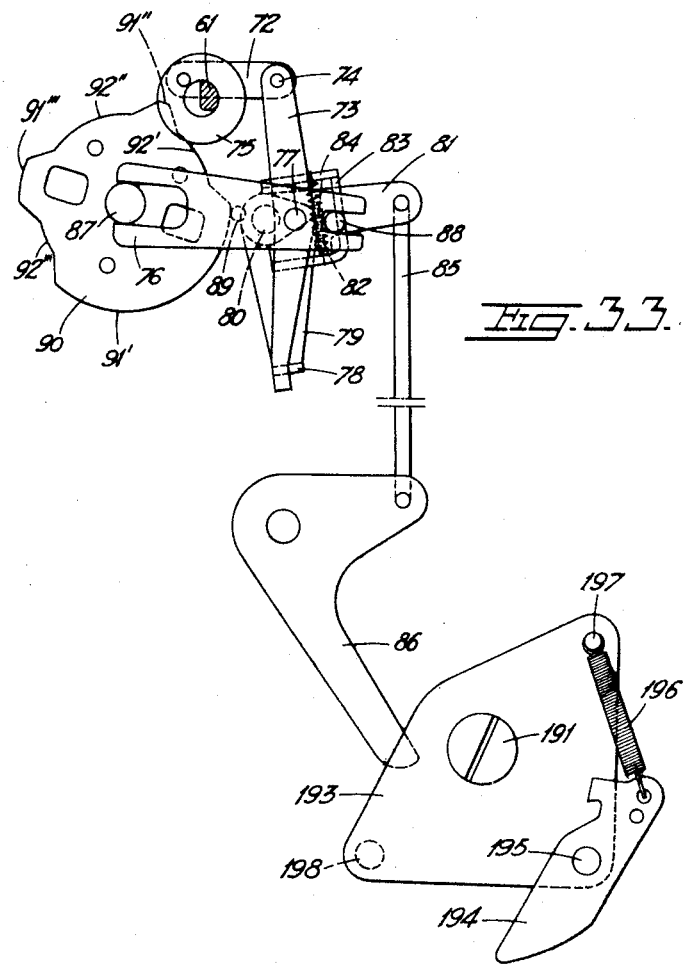

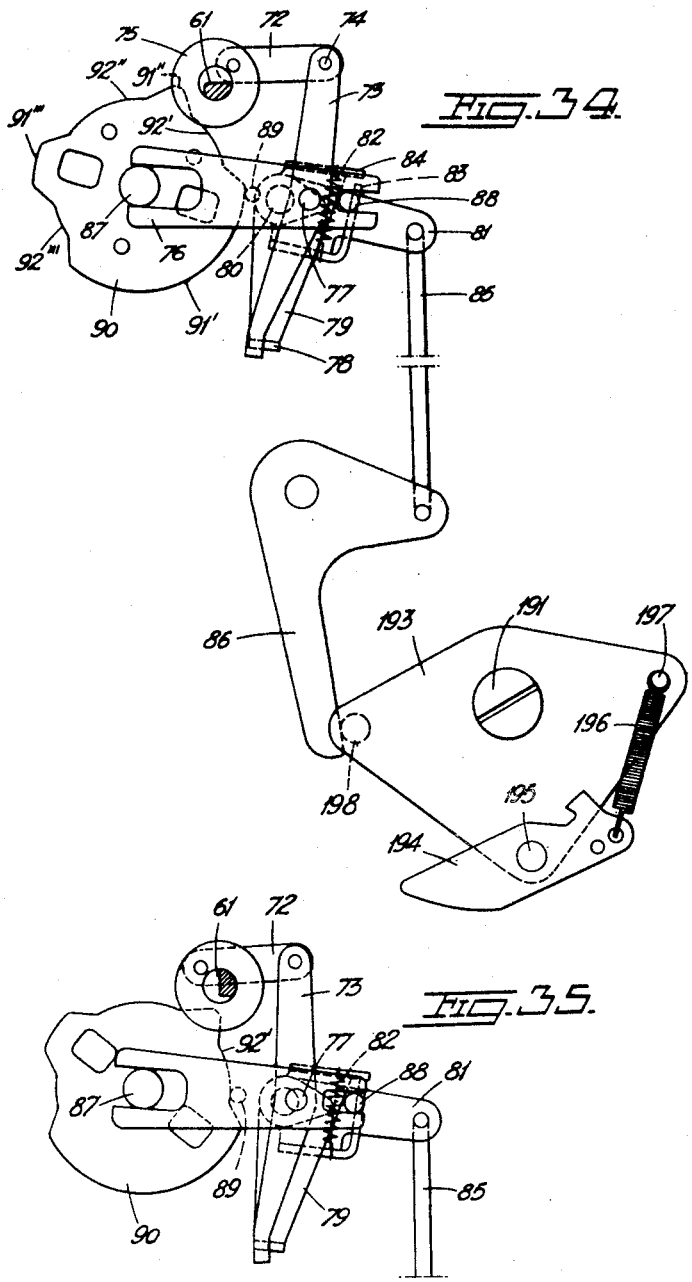

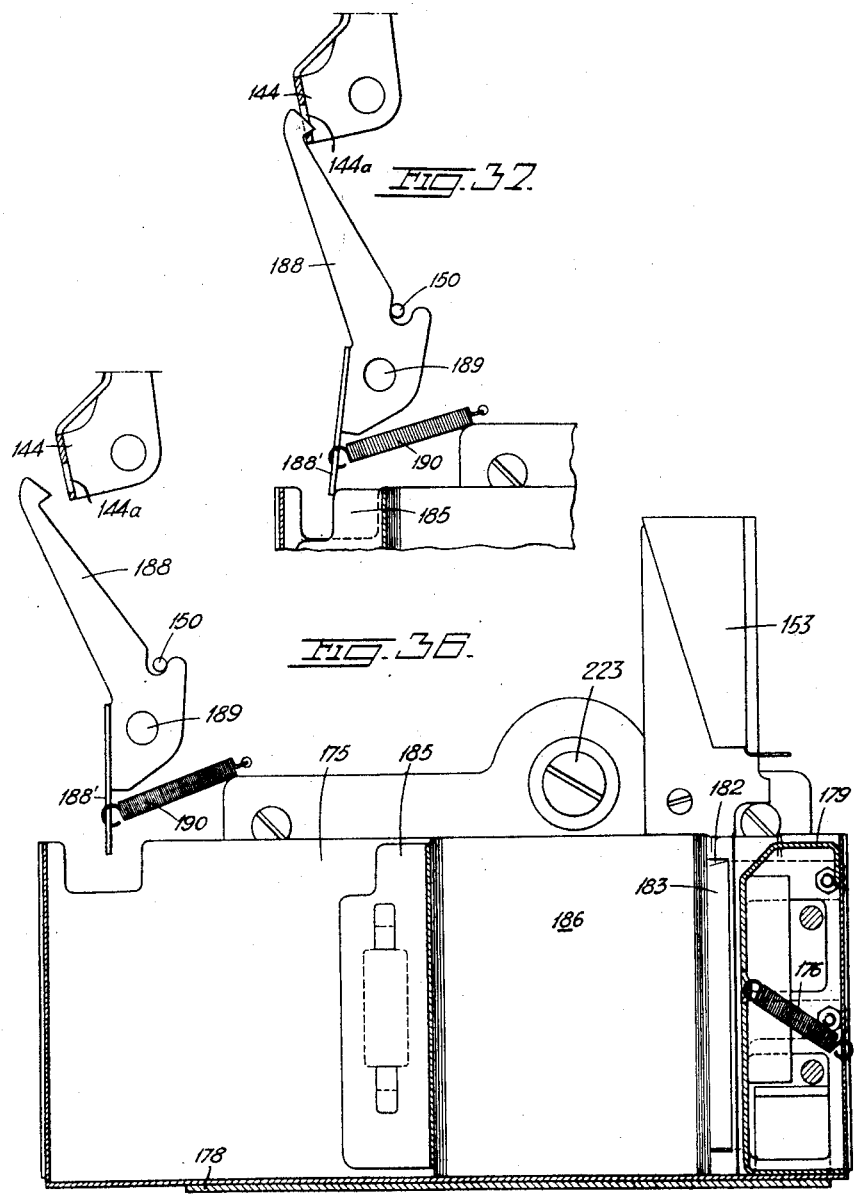

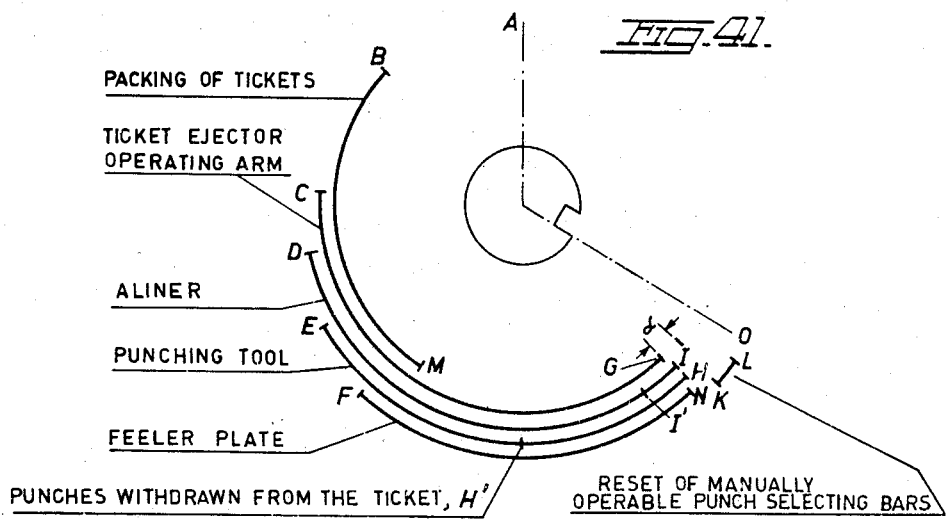
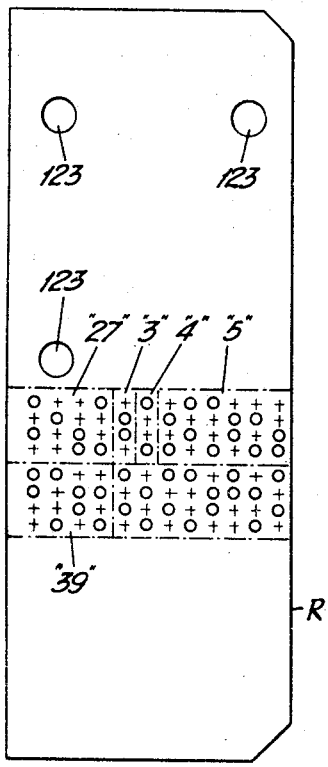

United States Patent Office 2,950,758
Patented Aug. 30, 1960

2,950,758

CASH REGISTERS, ACCOUNTING AND LIKE MACHINES

Gösta Roland Englund, Besmansvagen 44, Bromma, Sweden, and Mats Erik Mattsson, Sturegatan 35, Sundbyberg, Sweden Filed Mar. 9, 1956, Ser. No. 570,592

Claims priority, application Sweden Mar. 16, 1955

16 Claims. (Cl. 164—111)

This invention relates to cash registers, accounting and like machines and is particularly directed to a mechanism applied to such machines for providing records on separate tickets or tags in addition to the usual printed receipt or similar record strips. Such tickets or tags may then be converted into usual punched record cards to be analyzed in common card sorting and sensing machines.

The invention is shown embodied in a cash register for use in ordinary stores.

The primary object of the invention is the provision of a mechanism by means of which, especially when used in large stores or other lines of business, a correct and quick control of the present state of selling in various departments may be obtained.

Usually price trickets or tags are applied to articles in stores, said tickets or tags having a specification including price, size, material, color or the like, printed thereon as well as perforations corresponding to the printed specifications. When selling an article the clerk usually removes said ticket or tag and forwards it to a station, where it is converted into a normal punched card to be sorted and analyzed in usual manner for the calculation.

However, the data sensed is that which was previously recorded when the article was placed in the store. Possible changes, for instance of the price, do not appear from the ticket. Likewise, when changing the selling price of a stock of goods every ticket or tag must be replaced, which means a large waste of time. Furthermore said tickets do not show, for example any statement of the department and clerk having sold the article, the actual price and the customer's account, if not paid in cash. Moreover there is no definitely determinable correspondence between the cash register results and the bundles of tickets.

It is thus another object of this invention to provide a novel compact mechanism capable of recording any data entered in the cash register or like machines on a ticket or tag removed from the article that has been sold and of depositing the tickets or tags in correct order in a receptacle.

Another object of the invention is to provide in a mechanism of the type specified novel means for automatically transferring the setting of the cash register to record selecting means in said mechanism and effecting the perforation during a machine operation.

Still another object of this invention is to provide in a mechanism of the type indicated, replaceable, stationary record selecting means for perforating certain data on said tickets or tags referring to the actual department, machine or the like.

Another object of this invention is to provide novel replaceable means in connection with movable record selecting means for perforating certain data in combination with data set by the machine or in response to certain settings of the machine. Thus a clerk's individual number, the individual number of certain transactions, or the like, may be registered irrespective of the machine used.

A further object of the present invention is to provide manually settable means for entering certain data on said tickets, said data not being entered into the cash register or like machine.

A still further object of the present invention is to provide means for preventing the mechanism from functioning when a ticket is not correctly positioned for perforation.

A further object of this invention is the supplying of novel means for receiving the ticket last perforated in a separate chamber of the receptacle.

A still further object of this invention is the provision of novel means for preventing the operation of the mechanism when said receptacle is filled to capacity.

These and other objects and advantages of the invention as well as certain novel features of construction and combination of parts will be apparent from the appended claims and the description of a preferred embodiment with reference to the drawings annexed to and forming a part of this specification.

In said drawings:

Fig. 7 is a view similar to Fig. 6 and showing the coupling actuating means in operative condition.

Fig. 8 is a fragmentary sectional view of the perforating mechanism substantially taken along line VIII—VIII in Fig. 3 and showing the punches in resting position.

Fig. 9 is a view similar to Fig. 8 showing the punches in punching position.

Fig. 10 is a fragmentary sectional view taken substantially along line X—X in Fig. 8 with a ticket feeding mechanism removed for the sake of clearness.

Fig. 12 is a view similar to the lower part of Fig. 11 showing said operating means in an intermediate position.

Fig. 13 is a view similar to Fig. 12 showing said operating means in a subsequent position for releasing the ticket receptacle actuating means.

Fig. 17 is a fragmentary sectional view taken along line XVII—XVII in Fig. 3 showing feelers and their control means in ticket perforating position.

Fig. 18 is a view similar to Fig. 17 showing said feelers in ticket ejection position.

Fig. 19 is a schematic detail view of the ticket ejection mechanism in inoperative opened position.

Fig. 20 is a view similar to Fig. 19 of the ticket ejection mechanism in operative position for ejecting a perforated ticket.

Fig. 21 is a perspective detail view of driving members of said ticket ejection mechanism.

Fig. 22 is a perspective view of details of said ticket ejection mechanism for moving the ticket ejection members apart.

Fig. 23 is a schematic elevational view observed from the left of the machine and showing a ticket return mechanism.

Fig. 24 is a schematic elevational view observed from the left of the machine and showing a control mechanism operatively connected with the starting mechanism of the machine.

Fig. 25 is a fragmentary plan view of a detail of the control mechanism for sensing the position of said feelers (compare Figs. 17, 18).

Fig. 26 is a detail view, in side elevation, of a punch selecting member or bar including interchangeable punch selecting parts or keys.

Fig. 27 is an elevational detail view of the punch selecting bar shown in Fig. 26 and of control members for same.

Fig. 28 is a sectional detail view taken substantially along line XXVIII—XXVIII in Fig. 27.

Figs. 33, 34 and 35 are similar schematic detail views of a mechanism for automatically resetting said manually operable punch selecting bars, said mechanism shown in different positions in the respective figures.

Fig. 36 is an elevational detail view of the ticket receptacle.

Fig. 37 is a detail view showing a locking mechanism acted upon by the pile of tickets in said receptacle.

Fig. 41 is a diagrammatic view of angular displacements corresponding to the operative periods of the respective members of the mechanism.

Fig. 42 is a facsimile of the type of ticket used in the machine shown after having been perforated by the mechanism.

*General description*

Figure 1:
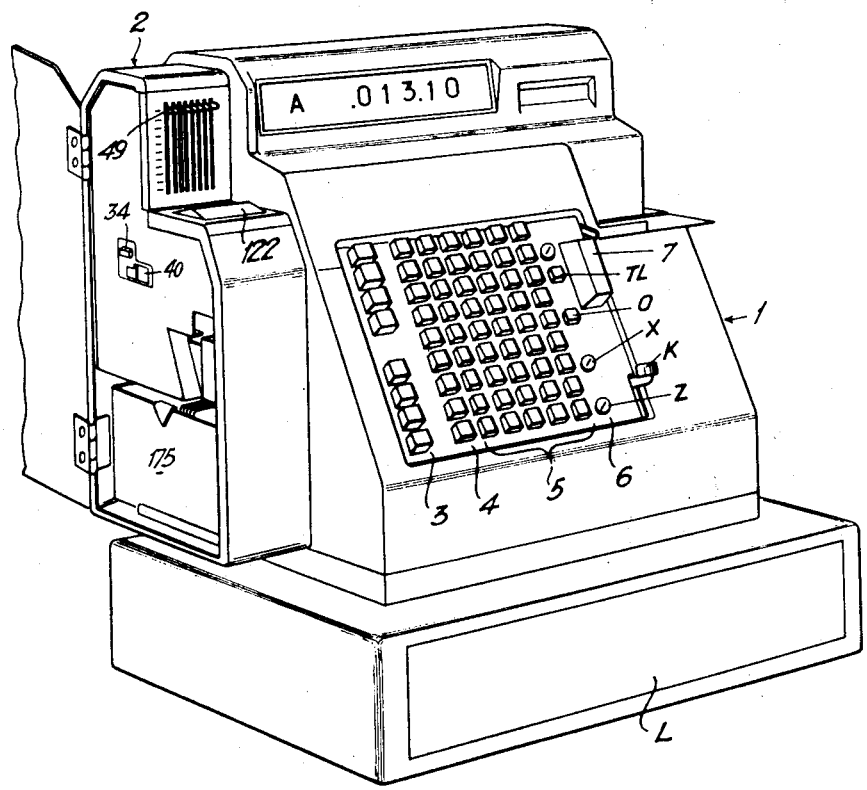
Fig. 1 is a general perspective view of a mechanism according to the invention applied to a cash register and enclosed in a casing having a door thereof opened.

In Fig. 1 a cash reigster 1 is shown which is provided with a unit 2 for perforating data on tickets. This unit consists of a punching mechanism for making perforations in tickets of any suitable sheet material such as paper, plastic, metal or the like. The perforating mechanism is located in a separate casing on the left side of the cash register. The keyboard of the cash register may be fitted out in any suitable manner. In the embodiment shown the keyboard is equipped at the left with a clerk's key bank 3 including eight clerk's keys. Of course the register may be correspondingly furnished with eight cash boxes although only one box L is shown for the sake of clearness. Said key bank 3 may be divided into two groups each including four keys and one group may include the clerk's keys while the other group is used for indicating account numbers or the like. The second key bank 4 from the left includes nine transaction keys. The third key bank from the left of the keyboard includes five rows of amount keys 5 and to the right thereof a key bank 6 is provided. This key bank relating to modes of operations includes four keys which are respectively designated, starting from the bottom; Z for zero setting of the clerk's totalizer, X for reading the clerk's totalizers, O for "no receipt" and TL for total. Finally a starting or motor release bar 7 is provided at the right of the keyboard and beneath the same a key K is provided for correction of the setting of the keyboard.

The cash register is manipulated in the usual manner by the keys for instance from the left to the right. At the beginning of a machine operation the setting of the register is transmitted to a series of indicator pinions 8 on a telescope shaft 8', schematically shown in Fig. 5.

The unit 2 including said perforating mechanism comprises as main parts a ticket holder and a perforating or punching tool comprising a row of vertical groups of punches. In the preferred embodiment each group includes four punches, which permits punching of the figures 0 to 9 in accordance with a predetermined code. Selecting members are provided for actuation of the punches, each consisting of a bar, segment or the like. The edges of said punch selecting members or bars facing said punches are provided with groups of projections distributed in accordance with said code for cooperation with said punches. Said punch selecting bars may be positioned by the common manipulative means of the cash register as well as manually. The unit 2 includes further a ticket ejecting mechanism and a ticket receptacle.

The above mentioned and further parts of the machine will be more fully described in the following.

*Punch selecting members set by the machine*

Figure 5:
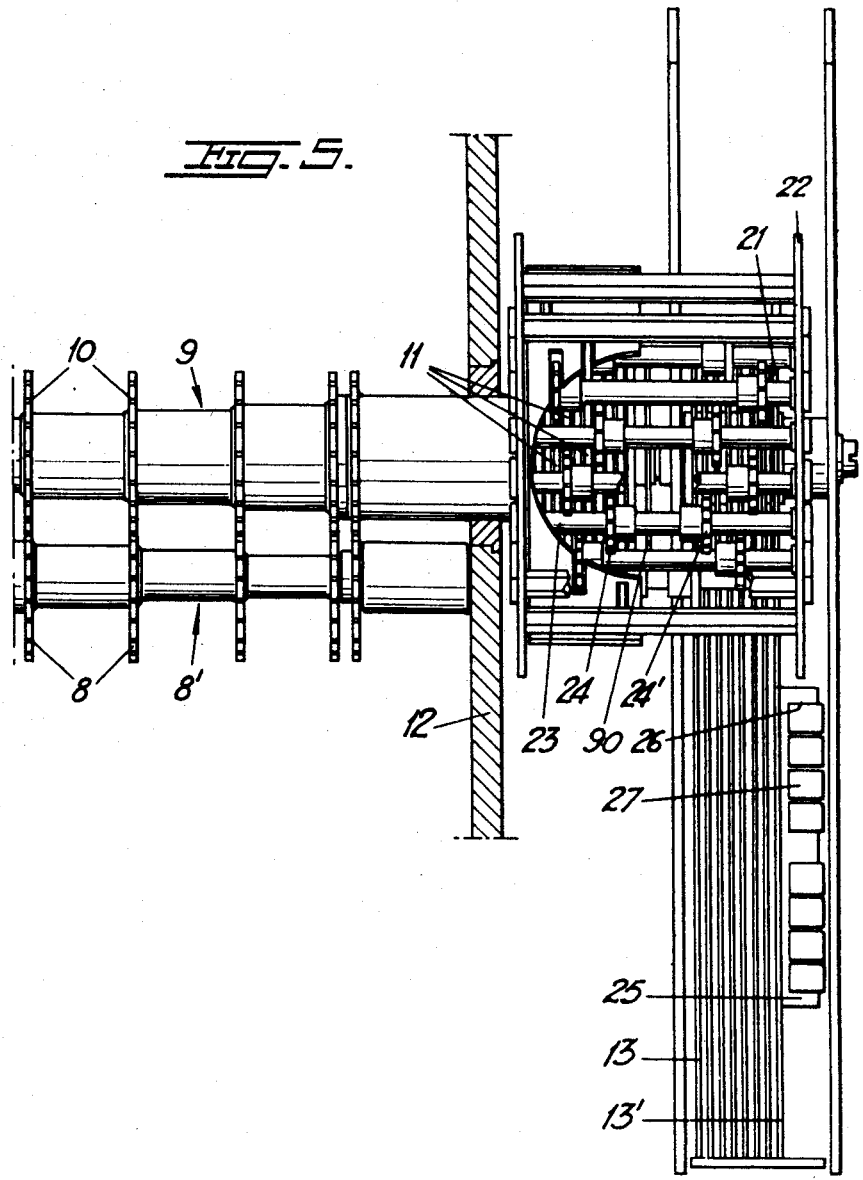
Fig. 5 is a fragmentary sectional view observed from the left in Fig. 4 and showing corresponding details.

The punch selecting members or bars may be either directly or indirectly connected with the indicating means of the register such as the ordinary indicator pinion 8 (Fig. 5). In the embodiment shown, however, a second telescope shaft assembly generally designated 9 is mounted parallel with the aforementioned telescope shaft assembly 8' in operative engagement with the same. Said second shaft assembly 9 is adapted to carry the movement of the indicator pinions 8 to the left of the machine, while said ordinary shaft assembly 8' is adapted to carry the movement to a printing mechanism at the opposite side of the machine. Each indicator pinion 8 meshes with its pinion 10 secured to a hollow shaft of the assembly 9. The respective pinion 10 is by means of its hollow shaft connected to its own gear wheel 11 outside the left side wall 12 of the cash register casing.

The punch selecting members consist in the preferred embodiment of a series of straight bars 13 (Figs. 4, 5), said bars have an upper rack portion 14 on their rear edge and a series of projections 15 groupwise arranged in a predetermined code system at the lower part of their front edge (Fig. 42). Each group of projections 15 may act on the vertical row of four punches due to the position of the selecting bar so as to give different combinations of punches corresponding to the figures 0 to 9. The bars 13 have wedgeshaped notches 16 at the lower rear edge thereof for proper alinement of the bars as will be more fully hereinafter described.

The bars 13 are vertically slidable while guided on their front edge by an upper and lower guide plate 17 and 18 (Fig. 4) respectively and on their rear edge by a guide plate 19 of substantial length. Said plate 19 further serves as supporting means for the punching tool. As is clearly shown in Fig. 5 the punch selecting bars 13 are transversely spaced in order to permit a series of manually operable punch selecting bars 20 (Figs. 30, 32) to operate therebetween, which will be more fully described in the following. In order to keep the punch selecting bars 13, 20 laterally in proper spaced relation they are guided by comblike guide members (not shown).

Figure 4:
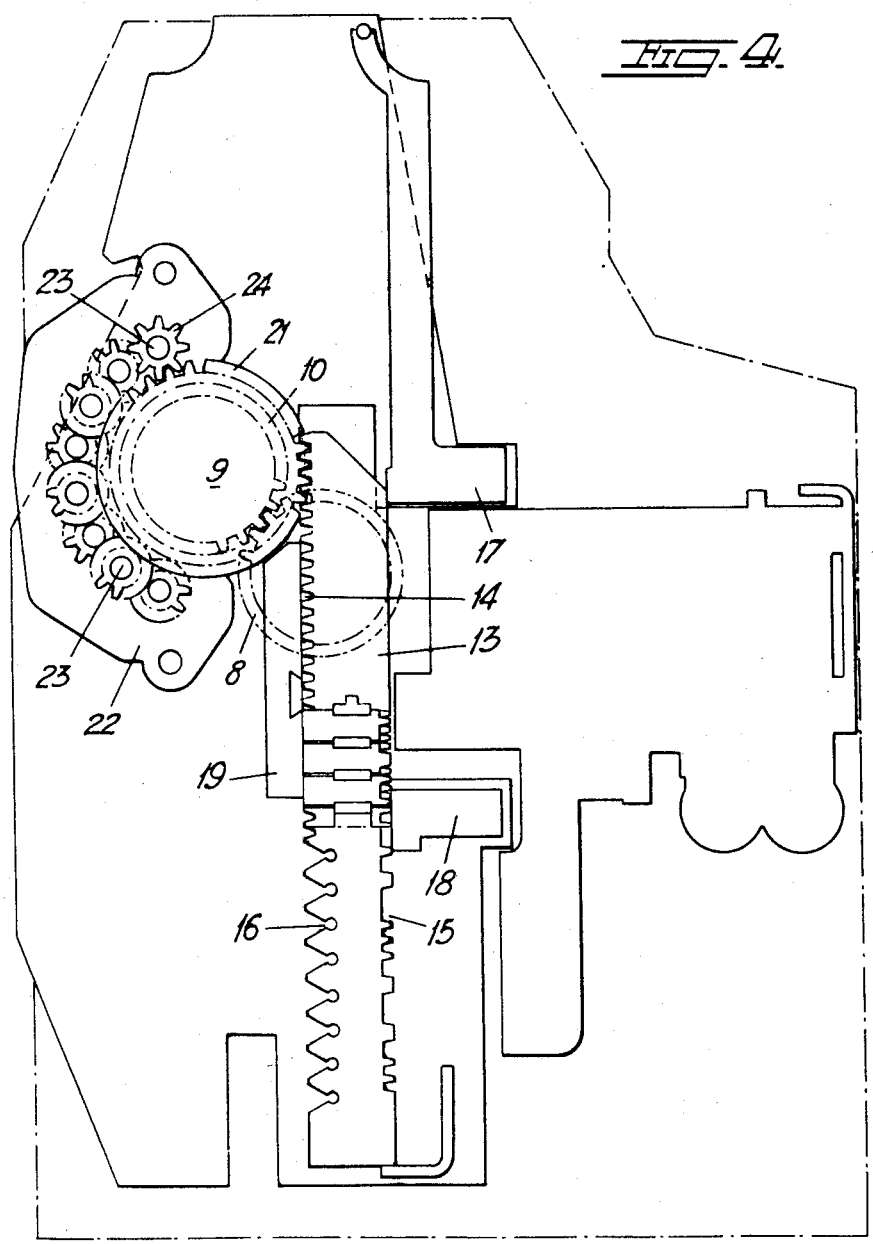
Fig. 4 is a schematic sectional view observed from the left and showing transmission means for setting punch selecting members in the perforating mechanism in correspondance with the data entered into the cash register.

Each rack portion 14 of the punch selecting bars 13 meshes with its own gear 21 (Figs. 4, 5). Said gears 21 are individually mounted coaxially with the telescope shaft 9. A frame 22 bridges the two groups of gears 11 and 21 and supports a series of rotatably mounted shafts 23 extending over the two previously mentioned groups of gears 11, 21 and has each a pair of gears 24, 24′ secured thereto. Said gears 24, 24′ act together with their shafts 23 as members for transmitting the movement of the gears 11 of one group to the respective gears of the other group 21. This gear mechanism makes it possible to transmit the movement of any gear 11 of the one group to an arbitrary gear 21 of the other group and thereby to any desired punch selecting bar 13. It is thus apparent that the setting of any of the control members of the cash register may be transmitted to any desired punch selecting bar 13. The manipulating of the keys on the keyboard of the machine will, thus, provide a corresponding selection of punches in the respective groups and a corresponding punching in the ticket.

As is shown in Fig. 5 the outermost punch selecting bar 13′, corresponding to the clerk's key bank 3, in addition to its normal projections 15 (Fig. 26), is provided with a socket member 25 secured to the left side of the bar. The socket member 25 has a series of recesses 26 (Fig. 26) of a number corresponding to the number of keys in the clerk's key bank 3, that is, eight ones in the embodiment shown. The clerk's punch selection bar 13′ is arranged to take up eight definite positions corresponding to the figures 1 to 8 according to the selected code. One recess 26 corresponds to each such position. As is apparent from Fig. 26 the selecting bar 13′ performs a movement which is analogous to the remaining selecting bars, and a blind position exists between two groups each including four positions. The recesses 26 are deep enough to extend over four adjacent vertical rows of punches, which corresponds to four punch selecting bars 13. In each recess a part 27 called "code record key" (Figs. 4, 28, 29) is insertable.

Figure 29:
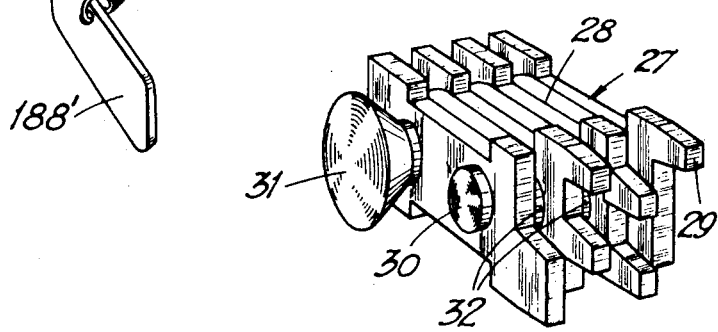
Fig. 29 is a perspective view of an interchangeable punch selecting key.

Said "code record key" may be considered to consist of an assembly of four fragmentary punch selecting bars 28 provided with projections 29 corresponding to the projections 15 on the bars 13. Therefore, besides the one-figure marking of the proper bar 13′ a selected four-figure number may be punched for each position of said punch selecting bar 13′. As is best shown in Fig. 29 the fragmentary bar portions 28 of the "code record key" consist of a group of small plates held together by two rivets 30, 31. One (31) of said rivets is provided with an enlarged head 31 so as to be seized by the fingers when inserted and removed from a slide 33 (Figs. 27, 28), as will be more fully described hereinafter. Spacer plates 32 are inserted between the small plate portions 28, the thickness of the spacer plates corresponding to the lateral space between adjacent punch selecting bars 13, so as to locate said plate portions with a pitch corresponding to the lateral pitch of the punches (Fig. 28). In Fig. 27 and Fig. 28 the slide 33 is schematically shown movable in the punching tool mounting plate 19, perpendicularly to said bar 13′. The slide 33 has a head 34 at its outer end forming a finger grip. Said head 34 has a dovetail shaped vertical groove 35 adapted to take up the head of the rivet 31 of the "code record key" 27 when inserted through an aperture in the slide and allow the "code record key" 27 to freely move vertically when the slide is pushed in place for operation. A stationary plate 36 outside the bar 13′ projects to the underside of said slide 33, so as to support the "code record key" at a correct level to be pushed into the respective recess 26 of the socket member 25.

In order to fix the position of said recesses 26 relative to the position of the slide 33 a locking member 37 is provided when the machine is at rest to engage the lower rear notches 16 of the clerk's punch selecting bar 13′. Moreover to prevent manipulation of the slide 33 during a machine operation a lock pin member 38 (Figs. 27 and 40) is journalled in the mounting plate 19 and adapted to engage a bore in the slide 33, when the latter is pushed into operative position. The lock pin member 38 is, as will be described in the following (Fig. 24), also connected with the starting member of the machine to serve as a feeler for the position of the slide 33 and to prevent starting at incorrect position.

Furthermore, a stationary "code record key" 39 (Figs. 27, 28) serves as punch selecting means for four vertical rows of the second or lower set of punches. Said "code record key" 39 is similar to the "code record key" 27 shown in Fig. 29 and is interchangeably mounted in a holder 40. The holder 40 may be secured to a mounting plate 42 by a screw 41 in order to support the "code record key" 39 in proper position with respect to the respective punches. As is apparent from Fig. 28 the active projections 29 of the "code record key" 39 are located between the active projections 29 of the clerk's "code record key" 27 and below the same. Thereby said "code record key" 39, is suitably referring to the location of the cash register and therefore called "department's code record key," will actuate the punches of said lower set. The "department's code record key" 39 resting with its lower surface against the bottom plate of the holder 40 and with its rear surface against a stationary end wall 43 of the plate 42 is maintained in proper position by a bent leaf spring 44 screwed to the holder 40.

*Manually operable punch selecting members*

As is previously mentioned the punch selecting bars 13, 13′ to be set by the machine are laterally spaced in order to actuate the upper set of punches (Figs. 5 and 28). Between the punch selecting bars 13 a corresponding number of manually settable punch selecting bars 20 are vertically slidable. It may be now mentioned that while the selecting bars 13 set by the machine are moved upwardly for increasing digits the manually operated bars 20 are moved in opposite direction. The manually settable selecting bars 20 actuate a lower set of punches and are guided by the same members 17, 18, 19 as the aforementioned punch selecting bars 13. The manually operated selecting bars 20 are provided with projections 45 (Figs. 30, 32) corresponding to the previously mentioned projections 15 although in reversed sequence. The rear edge of each manually operated bar 20 has a series of deeper notches 46 at the lower portion and a series of shallower notches 47 at the upper portion thereof. The top of said manually operated bars 20 is formed as a head 48 having a notch at the front edge to receive the rear end portion of finger grips 49. Said finger grips 49 are displaceable along vertical rods 50 secured to the casing. The finger grips 49 are caused to normally take up an upper position by means of coil springs 51, having their one ends secured to said finger grips 49 and their other ends secured to a bracket 52 at the rear of the casing. A sufficient length of the draw springs 51 is provided to prevent the spring force from varying substantially when setting the finger grips 49. The coil springs 51 are drawn around pulleys 53, 54. One set of said pulleys (53) is positioned to guide the coil springs parallel with the rods 50.

A bell crank lever 55, 57 (Figs. 31, 32) acting as a pawl for a purpose to be described is provided in alignment with each of said manually operable punch selecting bars 20 at the rear edge thereof. Each bell crank lever has a vertical arm 55 and a horizontal arm 57 extending rearwardly from the upper end of the first mentioned arm 55. The bell crank levers are pivotally mounted about a shaft 56 adjacent their upper ends. The tips of the vertical arms 55 are adapted to engage said notches 47 and some of the deeper notches 46 in the rear edge of said bars 20. The horizontal arm 57 is spring biased to press the tips of said arms 55 against said selecting bars 20. The springs 58, 58' performing said actuation have their one ends anchored to the ends of said horizontal arms 57 and their other ends alternatingly anchored to the respective one of two spaced rods 59, 59', so that there will be enough space for the springs to operate undisturbed.

The edge of each of the vertical arms 55 facing said punch selecting bars 20 has a cam shaped portion 60 sliding on a portion of the shaft 61 having dissymmetrical cross section. The cross section of said portion is such that when the shaft 61 takes up a first position shown in Figs. 30 and 32 the lower tips of the vertical arms 55 engage the notches 47, 46 and retain the bars 20 in their positions. When the shaft 61 is turned to a second position shown in Fig. 31 the tips of the vertical arms 55 are out of engagement with said notches 46, 47 thereby releasing the punch selecting bars 20 to permit the latter to be reset by the draw springs 51 to positions determined by recesses 62 in the top of the bars 20 engaging a stop 63. Said stop 63 is suitably resiliently mounted in the casing in order to smoothly retard said bars 20.

Figure 30:
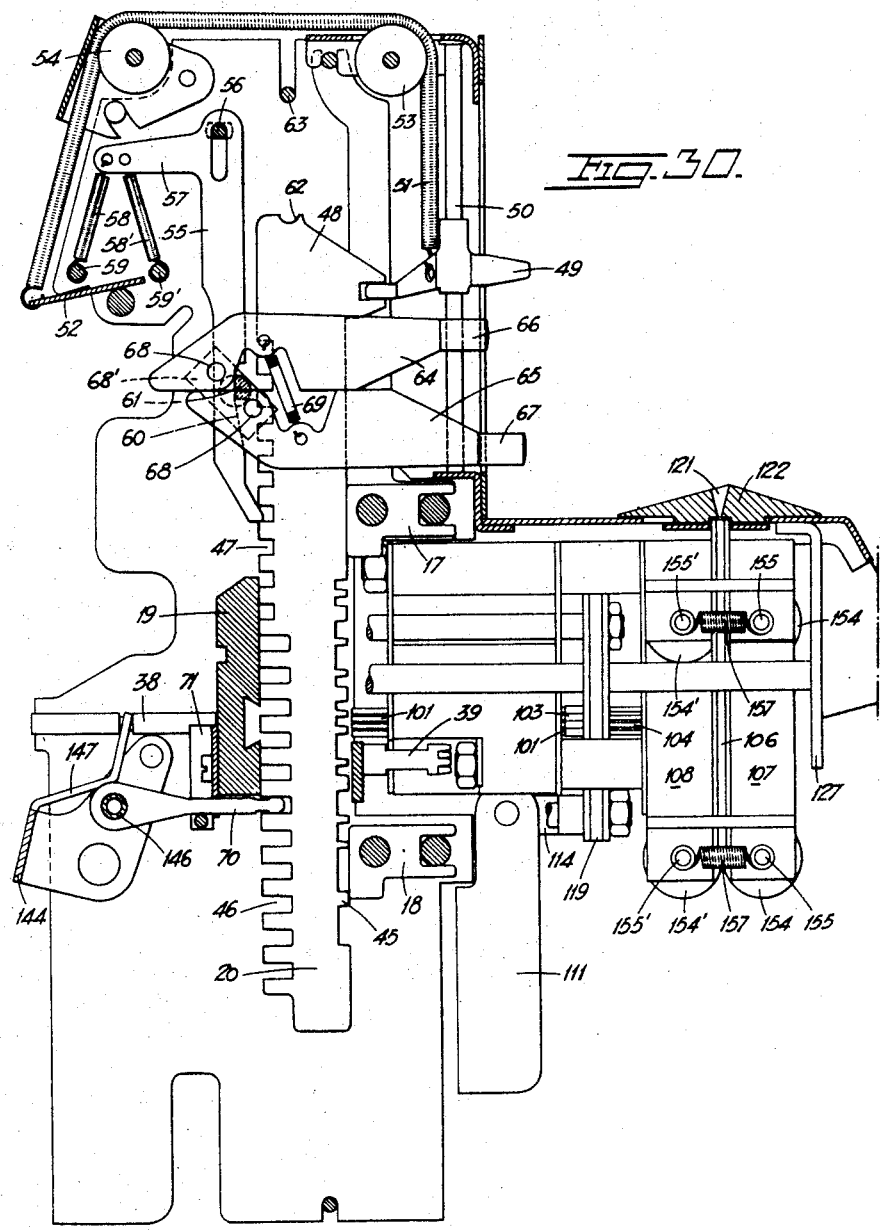
Fig. 30 is a part sectional fragmentary elevational view showing manually settable punch selecting bars in position for perforation.
Figure 31:
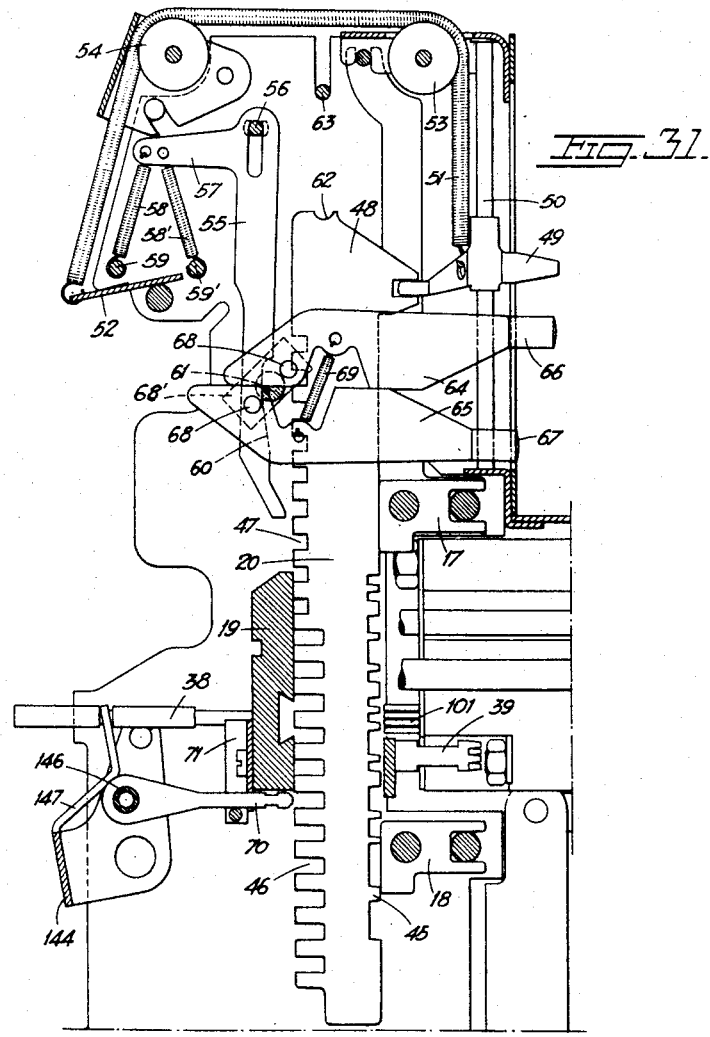
Fig. 31 is a view similar to Fig. 30 and showing the manually settable punch selecting bars in reset position.
Figure 32:
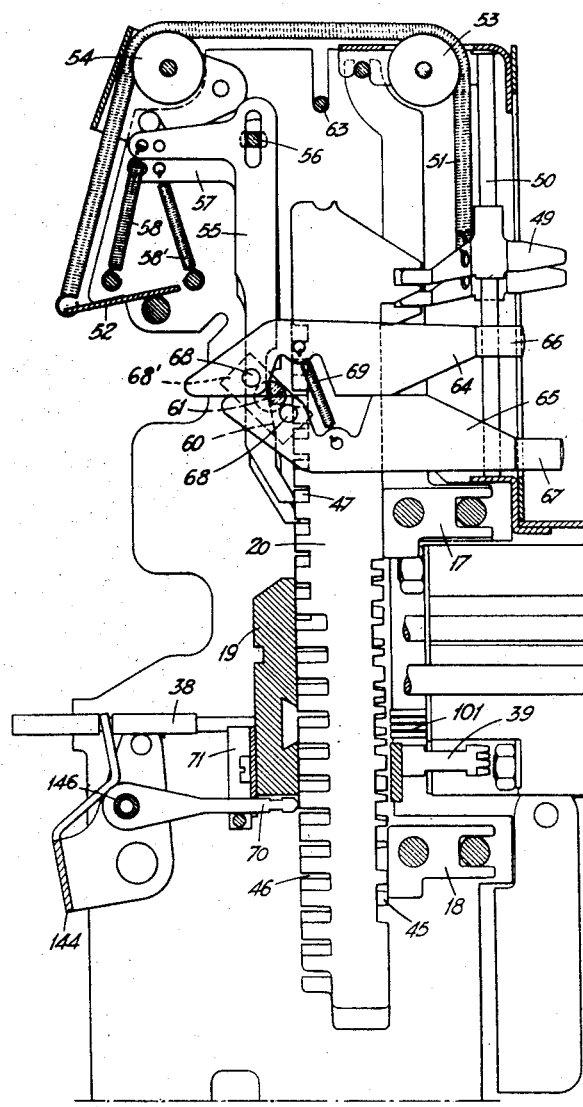
Fig. 32 is a view similar to those in Figs. 30, 31 showing one of said selecting bars in an intermediate position.
Figure 38:
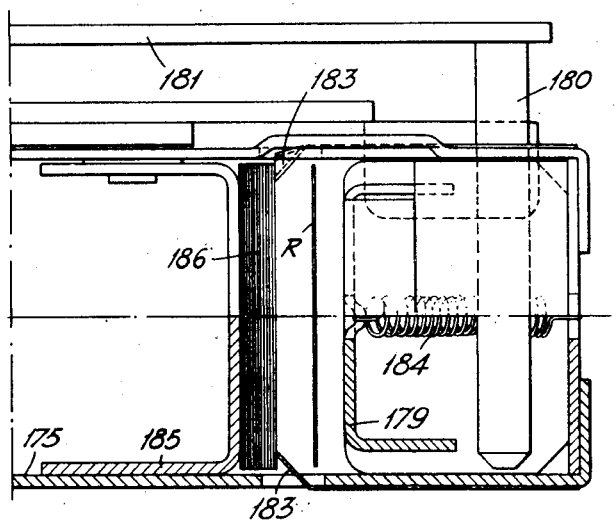
Fig. 38 is a detail plane view of a portion of said ticket receptacle in position for receiving a ticket.
Figure 39:
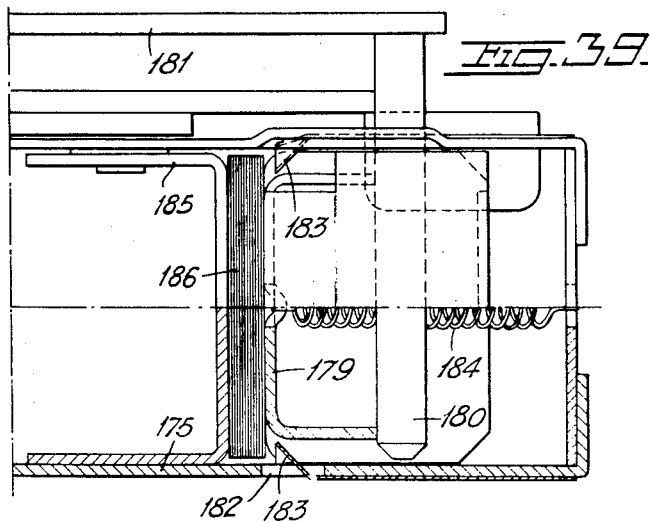
Fig. 39 is a view similar to Fig. 38 showing said ticket receptacle in ticket packing position.

The adjustable shaft 61 may be operated by means of a pair of plate slides 64, 65 operable to two positions. The ends of said slides extending outside the casing are provided with keys 66, 67 respectively as shown in Figs. 30–32. The upper key 66 is adapted when pushed in to make said vertical arms 55 operative to act as pawls for said punch selecting bars 20. The lower key 67 is adapted when pushed in to disengage said arms or pawls 55 and permit said punch selecting bars 20 to be reset by the force of the springs 51.

The inner ends of said plate slides 64, 65 are each provided with a pivot 68 engaging a lever 68' (Fig. 30), secured to said adjustable shaft 61. The plate slides 64, 65 are interconnected by means of a spring 69 adapted to perform a snap action resiliently holding said slides 64, 65 in either of said two positions.

To permit the adjustment of a finger grip 49 from a higher digit to a lower digit, namely upwardly, without resetting all of said finger grips 49, the bell crank lever 55, 57 is mounted on said shaft 56 by means of a vertical slot in said lever 55, 57 corresponding to one pitch of said notches 46, 47. Therefore the vertical arm 55 together with its engaging bar 20 may be moved upwardly one step against the action of the springs 58, 58'. At this movement the cam shaped portion of the vertical arm 55 will slide on the shaft 61 (Fig. 32) and thereby move away from the bar 20 and out of engagement with the respective notch 46, 47. As soon as the tip of the vertical arm 55 is disengaged from the notch the vertical arm 55 will immediately be moved downwardly by the force of the spring 58, 58', into engagement with the next one of said notches 46, 47.

In order to hold the manually operable punch selecting bars 20 blocked up in their proper positions when starting the machine and during a machine operation further blocking members 70 (Figs. 30–32) are provided at the lower side of said mounting plate 19. These members 70 are adapted to engage said deeper notches 46 in the lower rear edges of said bars 20 and are slidably mounted in a bracket 71 secured to said mounting plate 19. The blocking members 70 are operatively connected with the starting bar 7 of the machine as will be more fully described in connection with feeler and blocking means.

For automatic operation, the shaft 61 is further connected to a linkage located adjacent the side wall 12 of the cash register and schematically shown in Figs. 33–35.

Said linkage includes a link 72 having its one end connected with a disc 75 secured to the shaft 61 and its other end connected with an arm 73 by a pivot 74. When moving the pivot 74 to the right in Fig. 33 the shaft 61 will be turned for disengaging said vertical arms or pawls 55. The arm 73 of the linkage is intermediate its ends rotatably mounted about a pivot 77 secured to a plate slide 76. The opposite free end of the arm 73 abuts against a lip 78 of a lever 79 pivotable about a stationary stub shaft 80. A yoke 81 pivotally mounted about the stub shaft 80 cooperates with the lever 79 and is spring biased for relative clockwise rotation by means of a draw spring 82 anchored to said lever 79. A lip 83 on the yoke 81 cooperates with a lip 84 on the lever 79 to fix the relative positions of the yoke 81 and the lever 79. The yoke 81 is connected by a rod 85 with a bell crank lever 86 adapted to cooperate with a coupling member driven by the main shaft of the cash register as will be described in the following.

The plates slide 76 supporting said pivot 77 has a fork shaped portion slidably mounted on a shaft 87 co-axial with said additional telescope shaft 9 and by an opposite fork shaped portion on a shaft 88. The plate slide 76 is further provided with a stud 89 at the middle thereof. Said stud is adapted to cooperate with the edge of a cam 90 interchangeably mounted on said shaft 87. The cam 90 is operatively connected with mode of operation controlling means of the cash register. The transmission ratio is such that the whole adjustment range for said cam 90 takes up about one third of a revolution of the cam 90. By giving the cam 90 a shape of alternating high and low portions 91 and 92 respectively any desired combination of the cams for actuation on said stud 89 may be obtained. In the embodiment shown five modes of operation are present namely: + (adding), SX (reading the listing totalizer), TL (total taking), Z (zero setting of the clerk's totalizers), and X (reading the clerk's totalizers).

At the adjustment of the cam 90 shown in Figs. 33 and 35 the modes of operation X, Z and TL are located on the high portion 91' while the two modes of operation "SX" and "+" are located on the lower portion 92'. In Figs. 33–35 the cam 90 may take up three different angular positions as is apparent from the three angularly spaced studs in Fig. 34 and the circumference of the cam presents alternating high and low portions, namely three high portions 91', 91" and 91''' including different numbers of setting positions, and three low portions 91', 92" and 92''' of different numbers of setting positions, to wit: two, three and four positions.

The linkage of Figs. 33–35 operates in the following manner: When the cam takes up the position shown in Fig. 33 with the stud 89 resting on the high portion 91' the arm 73 will turn about the shaft 77 while actuated by the lip 78 on the lever 79, when the latter is moved clockwise by pulling the rod 85 downwardly. As a result thereof the pivot 74 will move to the right in Fig. 33 and turn the disc 75 and thereby the shaft 61 clockwise for disengaging said arms or pawls 55. The position the linkage takes up after this operation is shown in Fig. 34. From Fig. 34 it is also apparent that in order to secure a sufficient turning of the shaft 61 the movement of the rod 85 and of the yoke 81 is somewhat enlarged so that the yoke 81 performs a greater angular movement than the lever 79, whereby the spring 82 is stretched.

In the case the cam 90 is turned one step so that the stud 89 is located in register with a low portion 92' of the cam 90 the arm 73 will angularly move about the pivot 74 at a clockwise movement of the lever 79. The difference between the high and low portion 91, 91' is such that when the slide 76 is displaced on its supporting shafts the stud 89 just reaches the edge of said lower portion 92' when the rod 85 and the yoke 81 have completed their stroke. No actuation of the shaft 61 will take place and the manually operable punch selecting bars will remain in their adjusted positions.

Punching tool

As is previously mentioned the embodiment shown includes a mechanism for punching perforations in accordance with a predetermined code, although said record may be carried out in other manners.

In general the punching tool (Figs. 8, 9, 10) comprises a reciprocable body structure 93—107, Figs. 8, 9 including a ticket holder and slidable punches. The punches for each item include a vertical row of four punches. In the embodiment shown said rows of punches are arranged in two superposed groups 104, 104', the upper one 104 of which is adapted to be actuated by the punch selecting bars 13, 13', being set by the manipulative means of the cash register. The punches 104' of the lower group are actuated by the manually settable punch selecting bars 20 and the exchangeable punch selecting member or "code record key" 39. Transmission rods 101, 101' and 101" cooperating with said punches 104, 104' respectively extend outside said body structure to be stopped against the projections of said punch selecting bars 13, 20 and "code record keys" 27, 39 when the body structure is moved towards said bars.

The punch tool, best shown in Figs. 8 and 9, comprises a series of spaced guide plates 93—97, connected by means of pairs of bolts 98, 99. Between said guide plates 93, 97 suitable bearing means are arranged for said punches 104, 104' and said transmission rods 101, 101', 101". The tool is divided into two parts; one part formed by the juxtaposed guide plates 93, 94 slidably taking up the transmission rods 101, 101' arranged in two groups corresponding to said two groups of puches 104, 104' and the other part formed by the guide plates 95—97 slidably taking up the punches 104, 104'.

The ends of the rods 101 in said upper group of vertical rows extend outside said plate 93 to cooperate with every second one of said punch selecting bars, namely the machine operated bars 13, 13' (compare Fig. 28) and the punch selecting members of the clerk's "code record key" 27. The ends of the rods 101' of the lower group of vertical rows cooperate with the interjacent manually operable punch selecting bars 20.

As is shown in Figs. 8 and 9 a short guide plate 102 is provided for a number of transmission rods 101" of shorter length. Said rods 101" cooperate with said stationary exchangeable "code record key" 39.

The opposite end portions of said rods 101—101" are mounted in said guide plate 94 and extend outside the same to engage heads 103, 103' of said punches 104, 104'. The punches 104, 104' are slidably mounted in said guide plates 95, 96 of said other part of the punching tool. In resting position the punches end inside the apertures in said plate 96 forming a wall of a ticket receiving throat 106. A distance block 108 between said plates 95 and 96 has a large through opening surrounding said punches. In order to prevent the extremely thin punches 104, 104' from being broken, said large opening is filled with a white metal casting 105 which surrounds each punch and guides the same firmly along a sufficient length. The operative ends of said punches are obliquely cut to facilitate the punching of the ticket located in a throat 106, formed by said plate 96 and a plate 97 apertured to act as a die member. Outside said last mentioned plate 97 a backing member 107 is provided. Said backing member 107 supports one end of connecting bolts 98, 99 (Figs. 3, 10, 11) having their opposite ends threaded to receive nuts engaging the outside of the end plate 93 of the punch tool body structure. The throat 106 between said plates 96, 97 taking up the ticket R to be perforated includes feeler and ticket ejecting means that are described in detail below.

Said punching tool body structure is slidable along a pair of guide rods 109 (best shown in Fig. 11), one end of each of which is secured to said mounting plate 19 and the other ends to a bracket 127. To perform a punching operation said tool is reciprocated along said guide rods 109 by means of a U-shaped lever 111 under the control of a cam system, described in the following. Said lever 111 engages by means of heads 111' with a stud member 112 between said plates 93, 94 and is pivotable about a shaft 113 on a stationary bracket 114.

Between said two parts of the punching tool body structure including said transmission rods 101 and said punches 104 respectively is an interspace, in which assembled stationary guide plates 115, 116, 119 are provided and supported by said mounting plate 19 by means of a pair of bolts 117, 118.

One outer plate 115 and the intermediate plate 119 have corresponding large apertures permitting the enlarged heads 103 of the punches 104 to pass freely therethrough, while the guide plate 116 has a journal opening for each punch member 104, 104' preventing the passage of said enlarged heads 103.

Said stationary guide plates 115, 116 support a number of pins 120 slidably penetrating bores through the movable plates 95, 96 and the intermediate member 108. The points of the pins 120 are adapted to engage correspondingly placed holes in the ticket (compare Fig. 42), when the latter is correctly placed in said throat 106, and maintain the same in position during the punching, as is best shown in Fig. 9. Said ticket locking pins 120 cooperate with feeler means to be described.

After having placed a ticket R in said throat 106 in proper position with its holes in register with the pins 120 the punching tool is moved to the left in Fig. 9 by means of the lever 111. When so moved the transmission rods 101 in register with projections 15, 29, 45 on punch selecting bars 13, 20 or stationary or movable "code record keys" 39 and 27 respectively, are stopped. At the continued movement the punching tool is caused to perform a movement relative to the transmission rods and corresponding punches stopped by said projections, whereby the ticket R is penetrated by said punches. The remaining transmission rods 101—101" are permitted to move undisturbed with the punching tool.

When returning the punching tool (to the right in Figs. 8, 9, and 11) the enlarged heads 103 of the punches 104 displaced with respect to the punching tool will engage the stationary plate 116 and be relatively moved to their initial position shown in Fig. 8. At the same time the pins 120 will be withdrawn and release the perforated ticket to be ejected.

Feeler and control means

Figure 11:
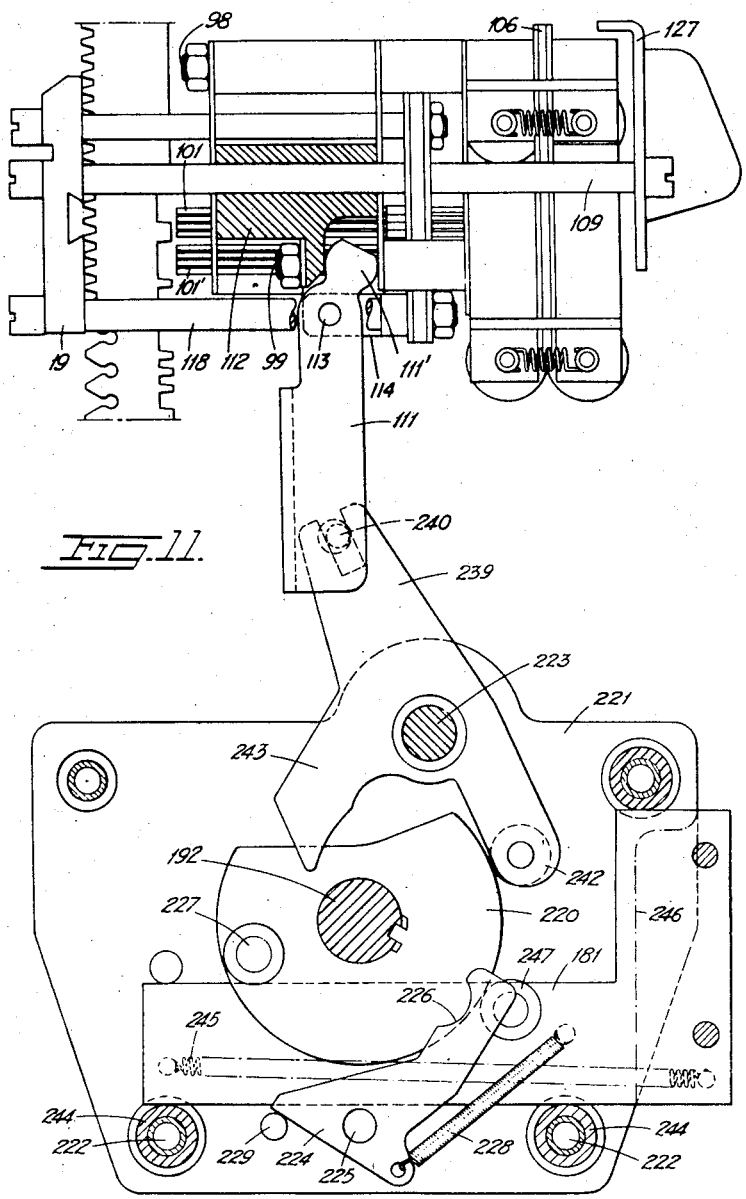
Fig. 11 is a part sectional detail view taken substantially along line XI—XI in Fig. 3 and showing the perforating mechanism and its operating means as well as means for actuating a ticket receptacle.
Figure 14:
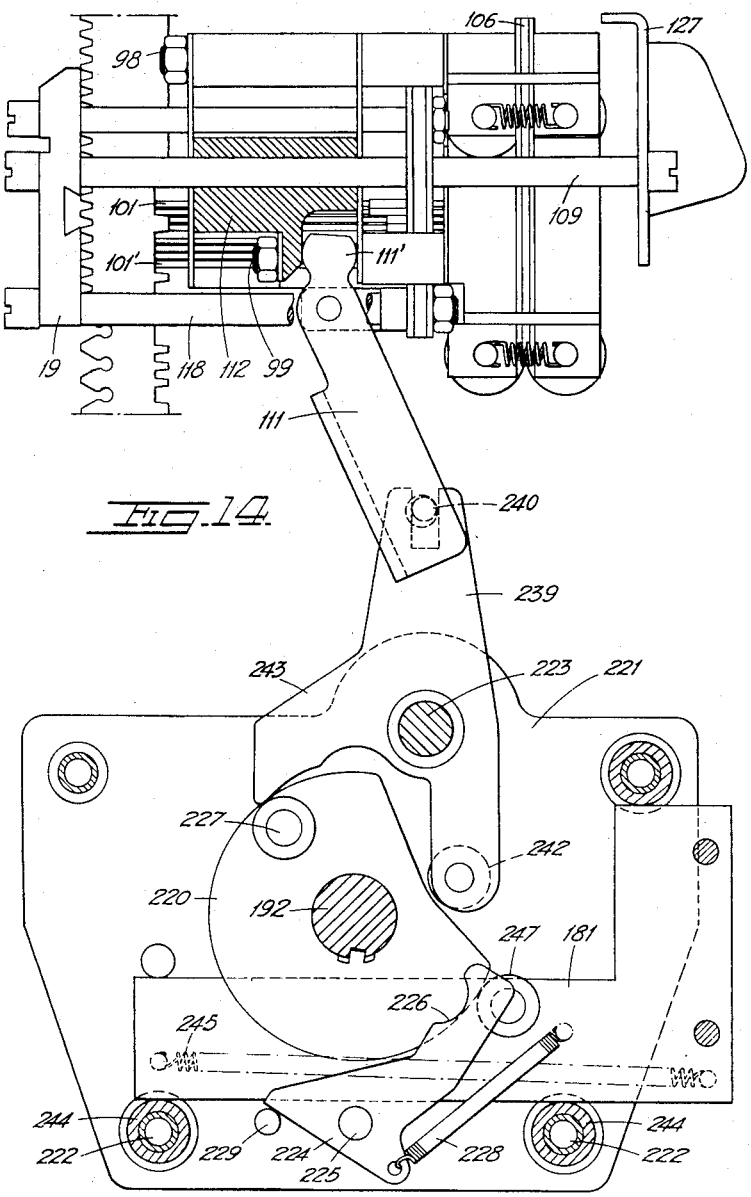
Fig. 14 is a view similar to Fig. 11 showing said operating means in position for perforating a ticket.

As is apparent from the drawings a ticket R (Fig. 42) is adapted to be inserted through a slit 121 in a bracket 122 (Figs. 1, 30) into the throat 106 (Figs. 8, 9, 11). The ticket R is considered to be pushed into said slit until the upper edge of the ticket R is flush with the upper side of the bracket 122. All tickets R should be furnished with three asymmetrically located holes 123 to be penetrated by the pins 120 correspondingly distributed (Fig. 10). Thereby tickets R of arbitrary length may be used, said length being limited only by the space beneath said throat 106.

Tubular pins 124 (Figs. 8, 9 and 17, 18) slidably mounted in the backing member 107 are provided with bevelled heads 125 engaging the bevelled points of the pins 120 so as to form obstacles in said throat 106. Each tubular pin 124 is biased by a compression spring 126 to resiliently engage the point of the corresponding pin 120, and the corresponding pin 120 and the oppositely bevelled surfaces of said two cooperating pin members 120, 124 form a wedgelike notch therebetween so that when a ticket is inserted into the throat 106 the edge of the ticket may move the tubular pin 124 away from its cooperating pin 120 and permit the ticket to be further moved to its correct position with said cooperating pins 120, 124 engaging said holes 123. Thereby the ticket R will be approximately centered and retained in the throat 106 as is best shown in Fig. 8. The opposite end portions of the tubular pins 124 are further guided in bores in the stationary bracket 127 and have such a length as to lie with their outer end surfaces in flush with the back surfaces of said bracket 127.

If a ticket R would not present a hole 123 in register with a pin 120 the head 125 of said tubular pin 124 will rest on the surface of the ticket spaced from the point of its corresponding pin 120. As a result thereof said tubular pin 124 will project from said back surface of the bracket 127 as shown in Fig. 18.

Upon said back surface of the bracket 127 a feeler plate 128 is slidably mounted by means of slots therein engaging grooved bushings 137. Said bushings 137 are by pins 138 secured to studs 129 mounted on said bracket 127 (Figs. 18, 19, 25). Portions cut away from the edges of said feeler plate 128 permit the outer ends of the tubular pins 124 to freely move above the back surface of said bracket 127 when said plate 128 is in a first position, while the remaining edge portions tend to prevent such movement, when the plate is in a second position. Furthermore a movement of the feeler plate 128 from said first position to said second position (shown by dot and dash lines in Fig. 25) may only be allowed when the ends of said tubular pins 124 are flush with said back surface of the bracket 127. The feeler plate 128 is operated by a bell crank lever 130 pivotable about a pivot 131 secured to the bracket 127. As is best shown in Fig. 24 the bell crank lever 130 is connected to a rocker member (not shown) at the lower edge of the cash register by means of a linkage 132, 133, 134 and 135. Said rocker member is connected with the starting bar 7 of the machine so as to be operated by the same.

If thus a wrong or defective card is inserted in the throat 106 or a proper card is incorrectly inserted, one or more of said feeler pins 124 will project above the back surface of said bracket 127 due to lack of perforations in register with said pins and prevent operation of said linkage 132–135 and thereby of the starting bar 7.

In order to permit the tubular pins 124 to be withdrawn during the ticket ejection period, the studs 129 supporting said bushings 137 are axially movable in the bracket 127 against the force of compression springs 136 inserted between a shoulder on said studs 129 and the inner surface of said bracket 127. Said springs 136 normally hold the feeler plate 128 against said back surface of the bracket 127.

To perform said lifting or axial movement each bushing 137 has a further radial groove for receiving fork shaped portions 139 of a rockable plate 140. Said rockable plate 140 is provided with a pair of noses 141 engaging shoulders 142 of said bracket 127. When said plate 140 is rocked clockwise in Fig. 17 the fork shaped portions 139 will thus raise said feeler plate 128 from its support, permitting the tubular pins 124 to be moved by the ticket when ejected. This lifting movement will take place immediately before said ticket ejecting period.

Figure 40:
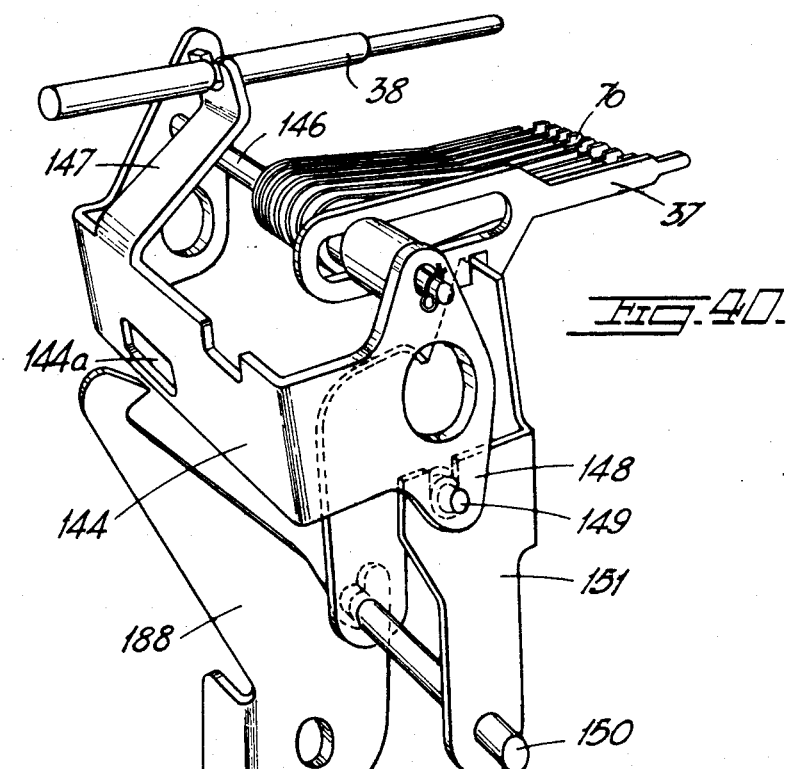
Fig. 40 is a perspective view of a control unit operatively connected to the starting means of the machine.

Many other control members are connected with said ticket feeler mechanism, said control members being governed from the linkage 133–135 by a rod 143. Said rod 143 is connected by its one end to a lever 133 of said linkage and by its other end to a yoke 144, as is best shown in Figs. 24 and 40. The yoke 144 is rockable about a shaft 145 secured to the casing.

The yoke 144 carries an assembly of alining and blocking members 70 for the manually settable punch selecting bars 20 (Fig. 30), said members being pivotally mounted on a shaft 146. Said shaft 146 is mounted in vertically elongated apertures in the opposite branches of the yoke 144 to permit the shaft 146 to perform a rectilinear movement determined by horizontal slots 152 (Fig. 2), in a frame plate through which the ends of the shaft 146 project. The free ends of said alining and blocking members 70 are slidably mounted in the bracket 71 secured to said punching tool mounting plate 19. A finger 147 integral with the yoke 144 has a fork shaped end portion receiving the grooved portion of cylindrical pin 38 slidable in said mounting plate 19 to engage a corresponding bore in said slide 33 when said slide is in proper position for operation of the machine.

Moreover the yoke is provided with a lug 148 provided with a pivot 149 engaging a slot in a U-shaped arm 151 pivotable about a stationary shaft 150. The U-shaped arm 151 has an upwardly directed portion coacting with a slot in a blocking plate member 37 in register with said clerk's punch selecting bar 13'. The plate member 37 is with its rear end reciprocable on said shaft 146 and with its opposite end slidably mounted in said bracket 71. Said plate member 37 will thus be moved into engagement with said punch selecting bar 13' when the machine is at rest, so as to permit the "code record keys" 27 to be interchanged while holding said bar 13' stationary.

The intermediate portion of the yoke has a recess 144a (Figs. 37, 40) to be engaged by a hook member 188 adapted to be actuated by a pile of tickets in a tray as will be described.

The yoke just described has the following functions:
To block the slide 33 for the clerk's record keys 27 during a machine operation and to prevent starting when the slide is not correctly inserted,
To block the manually settable punch selecting bars 20 during a machine operation, to align the same and to prevent starting when incorrectly set,
To block the clerk's punch selecting bars 13' when the machine is at rest and release the same during a machine operation and
To prevent starting of the machine when the ticket receiving tray is filled to its capacity.

*Ticket ejecting mechanism*

A ticket ejecting mechanism is provided to eject the ticket from the throat 106 as soon as the punching is performed. Said ticket ejecting mechanism is driven by the machine at the end of a machine operation. The ticket R ejected from the throat 106 is received by a hopper 153 (Fig. 2) and directed to a separate chamber of a ticket receiving tray or receptacle 175.

The ticket ejecting mechanism (Figs. 2, 19–22) comprises two pair of knurled feed rollers 154, 154' (Figs. 19–22), fastened on shafts 155, 155' respectively. Each pair of rollers has an upper roller and a lower roller. The shafts 155' of one pair (the left one in Figs. 19, 20) have each one end portion rotatably mounted in horizontal slots in plates 156 (Fig. 2) permitting the shafts 155' to move away from the shafts 155 in the other pair. Outside said plates 156 the shafts 155, 155' are connected by means of coil springs 157, anchored to bushing 158 mounted on the ends of said shafts 155, 155' outside said plates 156. Said coil springs 157 serve to hold the feed rollers 154, 154' urged against each other for engaging a ticket therebetween. The other ends of said displaceable shafts 155' are rotatably mounted in spherical bushings 159 received in correspondingly shaped recesses in a plate 160 located opposite the aforementioned plates 156 near the wall 12 of the cash register. The shafts 155 of the other pair are rotatably mounted in bearings in said opposite plates 156 and 160. Intermediate said plates 156 and 160 a further plate 161 is provided and secured to said plate 160 and spaced therefrom by distance members 162 (Fig. 21). Said shafts 155 and 155' pass freely through relatively large apertures in said intermediate plate 161. The space between said plates 160 and 161 forms a chamber enclosing a gearing for said feed rollers 154, 154'. Within said chamber the shafts 155, 155' are provided with gears 163, 164 respectively. The gears 164 fastened on the displaceable shafts 155' mesh directly with a large driving gear 165 rotatably mounted within said chamber. The gears 163 fastened on said stationary shafts 155 mesh with an idling gear 166 which meshes with said large gear 165. A rocking arm 167 extending beyond the circumference of said large gear 165 is freely mounted about the same pivot as the latter. A pawl 168 at the outer end of said arm 167 is adapted to engage the teeth of the large gear 165 when the arm 167 is moved in the direction of the arrow in Fig. 21. Movement of this arm in the opposite direction causes the pawl 168 to ride freely over the teeth on the gear 165. A leaf spring 169 is secured to said pawl 168 and frictionally engages the side surface of the larger gear 165 in order to turn said pawl 168 in and out of engagement in response to the direction of movement of said arm 167.

On the opposite side of said plate 161 a bar 170 is longitudinally movable parallel with a line through the axis of either of said shafts 155' and having end faces tapered in the same direction and engaging bushings 171 rotatably mounted in said shafts 155' so that when moving the bar 170 from the position in Fig. 20 to the position in Fig. 19 the shafts 155' will be swung about said spherical bushings 159 so as to move the feed rollers 154' away from the rollers 154 against the force of the springs 157. The bar 170 is between its ends provided with a stud 172 adapted to be engaged by a projection 173 on said arm 167 when the latter is moved in clockwise direction in Fig. 20 and engaged by another projection 174 when moved in opposite direction.

In order to prevent rotation of the spherical bearing bushings 159 said bushings have flattened surfaces which the end portions of a bar 175 positively engage.

In Fig. 19 the position of said ticket ejecting mechanism is shown in inoperative opened position. As is seen in Fig. 19 the feed rollers 154, 154' are opened in this position to permit a ticket to be freely inserted therebetween. When moving the arm 167 in clockwise direction in Fig. 19 the pawl 168 (clearly shown in Fig. 21) will freely slide over the teeth of said large gear 165. At the end of this movement the projection 173 engages the stud 172 and moves the bar 170 downwardly so that the feed rollers 154 and 154' are moved towards each other by said spring force thereby clamping the ticket between said rollers.

When moving the arm 167 in opposite direction the pawl 168 meshes with the teeth of said large gear 165 and rotates the same in counter clockwise direction in Fig. 20 (clockwise direction in Fig. 21). As is apparent the gear 165 and thereby the feed rollers 154, 154' will be rotated while urged against each other during almost the whole period of movement. At the end of said movement said other projection 174 of the arm 167 will engage the stud 172 and move the bar 170 upwardly thereby moving the rollers 154, 154' apart for permitting a new ticket to be inserted.

It may be noted that the swing movement of the shafts 155' about said spherical bushings 159 requires a back lash of the meshing teeth large enough to permit said obliqueness.

*Ticket receptacle*

Beneath the throat 106 in the punching tool the aforementioned ticket receiving hopper 153 (Fig. 2) is provided to take up the punched ticket R fed out from said throat 106 by said ticket ejecting mechanism, shown in Figs. 19–22. The hopper 153 guides the ejected ticket to a ticket receiving tray or receptacle 175 (Figs. 2, 36–39). Said receptacle 175 comprises an open rectangular tray held in place by the front and back walls 176, 177 respectively of the casing and by a flange 178 at the bottom of said casing. The receptacle 175 further includes ticket packing means in said tray comprising a U-shaped plate 179 slidable along the tray by means of a pair of pins 180 extending through a pair of suitable longitudinal slots in the inner longitudinal wall of the tray 175. The pins 180 are rigidly connected with a slide member 181 mounted to be reciprocated by the driving mechanism at the beginning of a machine operation, as will be further described in connection with the driving mechanism. Thereby said plate 179 is moved to the left in Figs. 36, 38, 39 to pack the tickets into a compact bundle beyond opposite flexible obstacle means 183 preventing a return movement of said ticket. The obstacle means consists of bent leaf springs 183 fastened to the surface of the longitudinal walls of the said tray 175 and extending through vertical slots 182 in said walls. The ends of said leaf springs 183 passed through said slots 182 are located at a listance from said ticket packing member 179 when the latter is in returned position so as to form a chamber therebetween for freely receiving a punched ticket when ejected. The movement of the plate or ticket packing member 179 is adjusted to just pass the tips of the edges of said opposite leaf spring members 183 so as to feed the ticket into said space beyond said tips to join said bundle 186 of tickets. Said opposite edges of the leaf springs 183 prevent the ticket bundle from moving back. The return movement of said packing member 179 is brought about by a coil spring 184.

Therefore a ticket may be securely received in the tray and if necessary the ticket last punched may be found without any doubt due to the fact that the packing movement is not performed until the next machine operation is carried out. Outside said flexible obstacle means 183 a back plate 185 is displaceable in said tray while frictionally engaging the inner walls thereof, thereby maintaining the tickets gathered together in a bundle. A pointer 187 (Fig. 2) is suitably fastened to said displaceable back member 185 and visible from outside said tray 175.

A lever 188 pivotable at 189 at the rear end of said tray 175 has a depending arm 188' extending into the path of said displaceable back member 185 (Fig. 36) and an opposite arm provided with a hook for cooperation with said recess 144a (Fig. 40) in the aforementioned yoke 144. The shaft 150 previously mentioned in connection with the description of feeler and control means serves to limit the angular movement of said lever 188, while engaging the slot therein. The lever 188 is biased (spring 190) to take up a position out of engagement with said yoke 144 when not actuated by said back member 185.

*Driving mechanism*

For operating the various parts of said perforating mechanism in proper sequence said parts are operatively associated with and driven by the main shaft 191 or an equivalent part of the machine during a machine operation.

Figure 6:
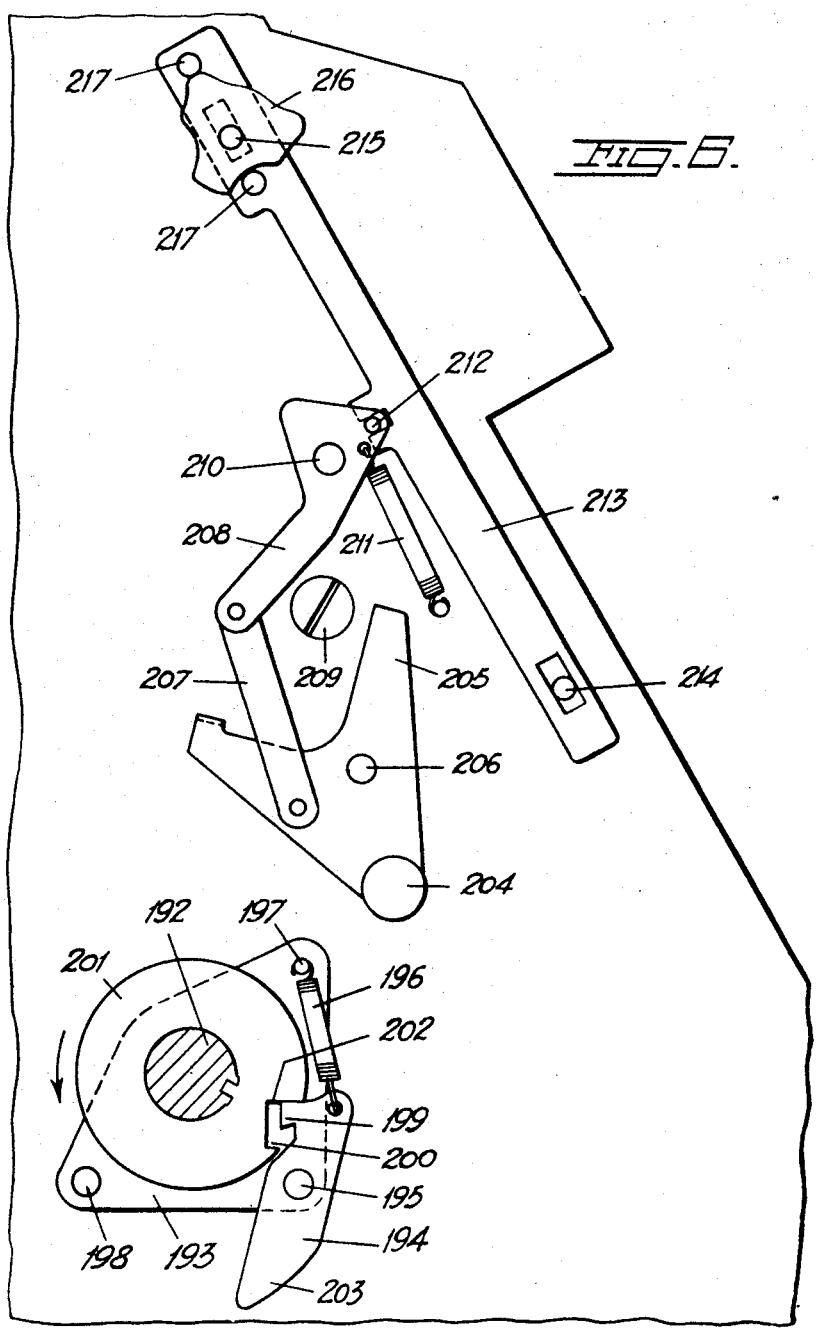
Fig. 6 is a schematic elevational view taken near the left wall of the cash register casing and showing coupling means for operatively interconnecting said cash register and said perforating mechanism and means for selectively actuating said coupling means, said actuating means being shown in inoperative condition.

In Figs. 6 and 7 a coupling device is schematically shown, said device being selectively operable for connecting the main shaft 191 of the machine with a main shaft 192 of the punching mechanism. As is best shown in Figs. 33 and 34 the main shaft 191 of the machine is provided with a triangular coupling plate 193. Near one apex of said triangular plate 193 a pawl member 194 is rotatable about a pivot 195 secured to said plate 193. The pawl 194 is actuated by a draw spring 196 having its one end secured to one end of said pawl 194 and its other end to said triangular plate 193 adjacent one of the other apexes 197 thereof. At the remaining apex a stud 198 is provided to engage the aforementioned bell crank lever 86 adapted to release the manually operable punch selecting bars 20 for zero setting of the same.

It should be noted that said main shaft 191 of the machine rotates counter clockwise in Figs. 6, 7, 33, 34 during a machine operation.

One limb of the pawl 194 is provided with a dog member 199 adapted to engage one edge 202 of an indentation 200 of a coupling disk 201 keyed on the main shaft 192 of the perforating mechanism and the other limb has a tip portion 203 adapted to strike a disconnection or actuating member 204 of a bell-crank lever 205, adjustable into two positions, when the latter is moved with its disconnection member 204 into the path of said tip portion 203. When striking said disconnection member 204 the pawl 194 is turned out of engagement with said indentation 200 leaving the main shaft 191 of the machine to rotate one cycle while being disengaged from said coupling disk 201 of the perforating mechanism.

Said bell crank lever 205 rotatable about a pivot 206 is operable by a linkage 207, 208, and provided with two legs limiting the movement of said lever by engaging the head of a screw 209 secured to said end wall 12 of the cash register. A link 208 of said linkage is turnable about a pivot 210 and actuated by a draw spring 211, tending to turn the link 208 clockwise in order to move said actuating member 204 into the path of the tip portion 203 of said pawl 194. The link 208 has a pin 212 engaging a transverse notch in a longitudinally slidable bar 213. At the lower end thereof said bar 213 is guided by a stationary pin 214 engaging a longitudinal slot in said bar 213. At its upper end the bar 213 has a longitudinal slot slidably mounted on a shaft 215, said shaft being adjustable in response to the mode of operation. A cam 216 is provided on the end of said shaft 215 outside said bar 213 and cooperates with a pair of opposite studs 217 secured to the same. The cam 216 is shaped to move the bar 213 between two positions, when turned to respective angular positions by the shaft 215.

Due to the fact that the shaft 215 takes up an individual angular position for each mode of operation the cam 216 may be shaped to actuate the bar member 213 in any desired manner to operate selectively said clutch means 199, 201 in response to the mode of operation.

Said two positions of the bar 213 are shown in Figs. 6 and 7 respectively. In Fig. 6 the bar member 213 is moved to its upper position thereby turning the disconnection member 204 out of the path for said pawl 194. Thereby the connection between the cash register and said punching mechanism is maintained. In Fig. 7 the bar 213 is moved to its other, lower position while turning the disconnection member 204 into the path of said pawl 194 thereby causing disconnection of the clutch.

As is apparent from Figs. 6 and 7 said main shaft 192 of the perforating mechanism always rotates a certain angle until it is disconnected from the main shaft 191 of the machine. The perforating mechanism is constructed, so that during this period (angle O, A, Fig. 41) no operation of the members of the proper punching mechanism is carried out, but only adjustment of said punch selecting bars 13 and 20.

Figure 3:
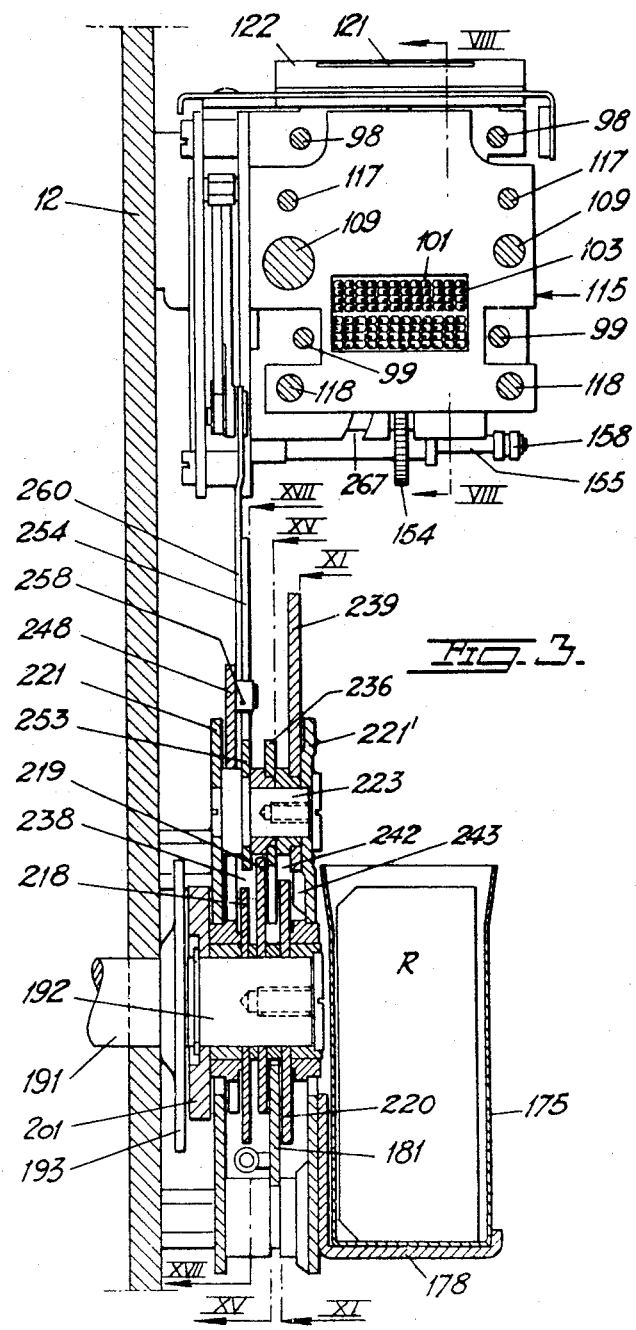
Fig. 3 is a fragmentary sectional view of the mechanism taken along line III—III in Fig. 2 and with some parts removed to enhance the clearness.

As is best shown in Fig. 3 the main shaft 192 of the perforating mechanism has three cams 218, 219 and 220 keyed thereon (compare Figs. 11–18). Said shaft 192 is mounted in bearings in opposite spaced walls 221, 221', which are held together by four bolts 222. Between said walls 221, 221' another shaft 223 is provided and adapted to rotatably support a series of cam followers.

As is mentioned above said clutch means for connecting the shafts 191, 192 together is such that at every machine operation of the cash register the shaft 192 of the perforating mechanism is angularly moved through the angle OA, Fig. 41 without actuating any punch member. In order to prevent the rotating parts from moving beyond said point A (compare Figs. 7, 12) a catch member 224 is pivotatably mounted on a pin 225 secured to the walls 221, 221' so as to engage a roller 227 secured to said cam 20, when the latter takes up the position shown in Fig. 12. The catch member 224 is yieldingly held in engagement with the roller 227 by means of a draw spring 228. A stop 229 is further provided for limiting the swinging movement of said catch member 224.

After the punch selecting bars 13, 13' are positioned during said first portion OA (Fig. 41) of a machine operation, said punch selecting bars 13, 13' must be exactly alined and retained in the alined position during the punching operation. This is important as the punching details have such small dimensions that even an incorrect adjustment of 0.001 inch would destroy the abutment faces of said punches or transmitting rods. For this purpose an aliner tooth 230 (Figs. 15, 16) is secured to an arm 232 rockable about a shaft 231. Said arm 232 is yieldingly connected to another arm 234 by means of coil springs 233, so that the first mentioned arm 232 may resiliently be turned counterclockwise if the movement of the aliner tooth 230 would be blocked. The aliner tooth 230 is adapted to engage the notches 16 in the punch selecting bars 13, 13' said notches having outer tapered portions for guiding the bars into proper positions and inner parallel portions of precise dimension for securing an exact adjustment of the bars 13, 13'.

Figure 15:
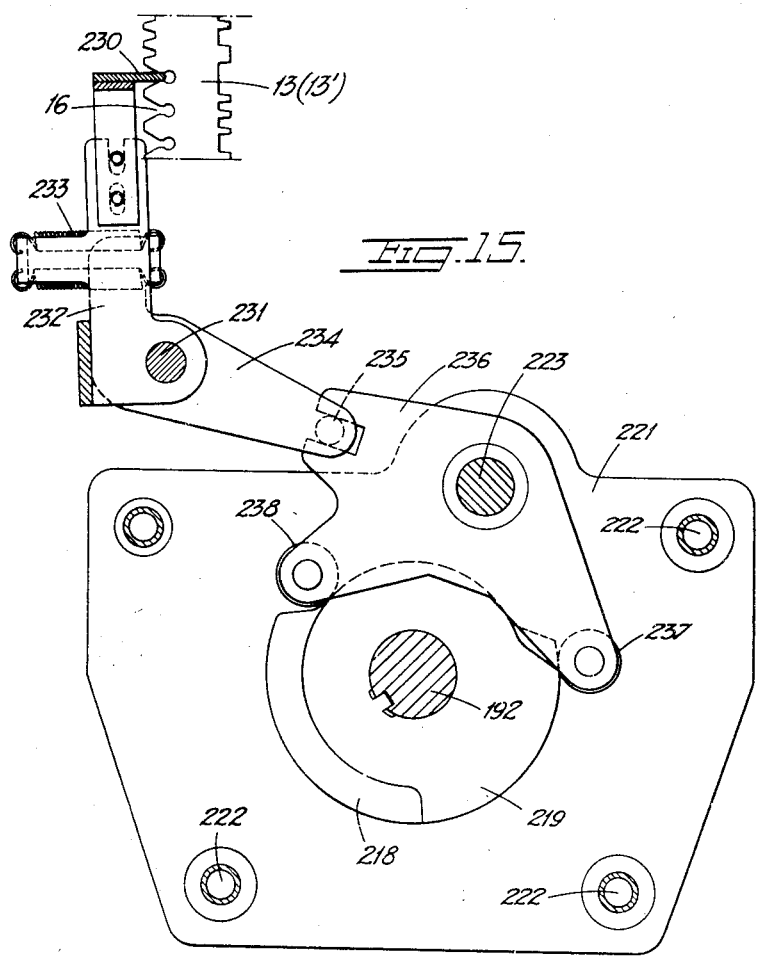
Fig. 15 is a sectional detail view taken along line XV—XV in Fig. 3 showing an alining bar mechanism in an engaged position.
Figure 16:
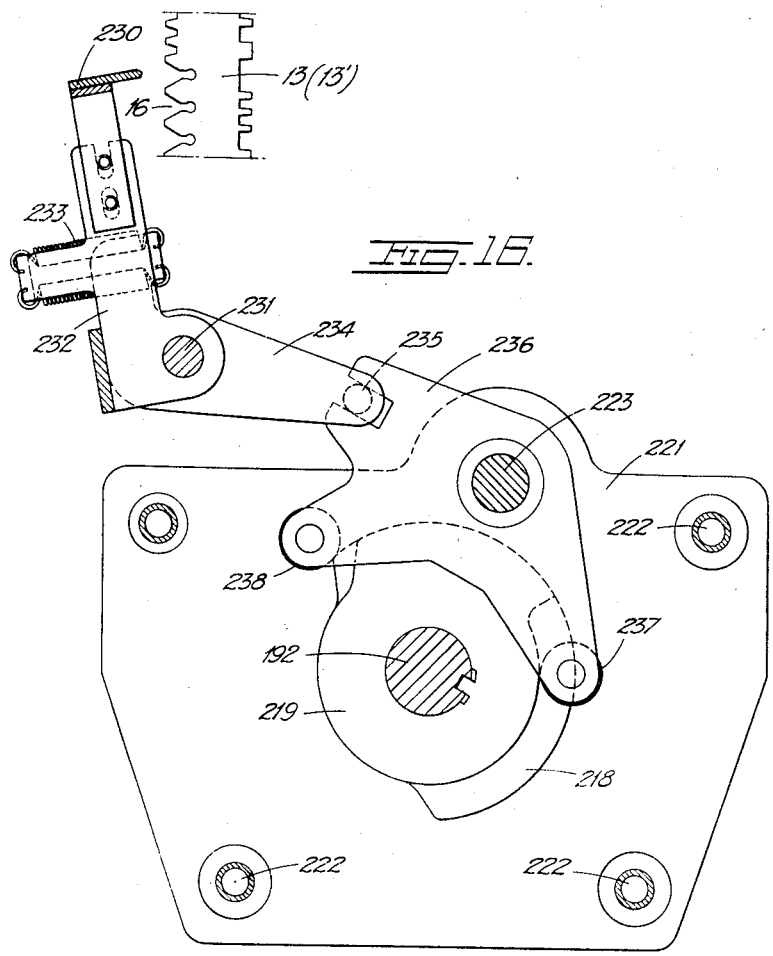
Fig. 16 is a view similar to Fig. 15 showing said alining bar in released position.

The aliner unit 230—234 is operated by a cam follower 236 which has a notch receiving a pin 235 on said arm 234. The cam follower 236 is rockable about said second shaft 223 and supports two peripherally spaced rollers 237, 238. The roller 237 is adapted to engage the second cam 219 and the roller 238 has such a width as to engage both the first cam 218 and the second cam 219. In Fig. 16 said cam follower 236 and the associated parts are shown in starting position (O, Fig. 41) for the shaft 191 and the aliner tooth 230 is out of engagement. The cams are shaped so that the cam follower 236 remains unaffected during the first angular movement to the position A of the shaft 192 and is actuated for moving the aliner tooth 230 into engagement only at the position D (Figs. 15, 41).

As mentioned above the punching tool is operated by the yoke shaped lever 111 (Figs. 11–14) when the latter is rocked about the stationary shaft 113. Said lever 111 is coupled to an arm of a rockable cam follower 239 by a slot and pin connection 240. The cam follower 239 is provided with an opposite arm supporting a roller 242 for engaging the third cam 220 and a lateral arm 243 adapted to cooperate with the aforementioned roller 227 mounted on said third cam 220.

In Fig. 11 the third cam 220 is shown in its starting position, with the roller 242 engaging a circular portion of the third cam 220. The length of said circular portion is such that when the shaft 192 and the cam 220 is angularly moved to point E in Fig. 41 (compare Fig. 13) the roller 242 passes beyond the end of said circular portion, which is followed by a recessed portion. Approximately at the same time the roller 227 on said third cam 220 strikes against said arm 243 to positively rotate the cam follower 239 clockwise. Thereby the yoke shaped lever 111 is turned counterclockwise to move the punching tool to the left in Figs. 8 and 9, so that the transmitting rods 101 engage their respective punch selecting members 13, 13', 20, 27, 39 for performing the punching. After having passed the recessed portion of said third cam 220 the roller 242 is positively moved to the right as shown in Fig. 11. Thereby said yoke shaped lever 111 returns the punching tool to its initial position, which is attained at point H in Fig. 41. However, the punches 104, 104' are withdrawn from said ticket receiving throat 106 already at point H'.

During the preparation period for punching and before said punching is carried out the ticket packing member 179 is moved by means of the slide plate 181 for clearing said small ticket receiving chamber in the tray 175 (Figs. 17, 18). The third cam 220 also controls this movement. The circular portion thereof engages a roller 247 on said slide plate 181 and maintains the ticket packing member 179 in position for receiving a ticket. In position B, Fig. 41 (compare Figs. 12, 13) the roller 247 is passed by said circular portion so that the slide plate 181 is permitted to be moved to the left in Fig. 11 by means of a draw spring 245 thereby effecting the packing of the tickets in the tray.

The slide 181 is reciprocating on grooved rollers 244 rotatably mounted on said bolts 222 holding said end walls 221, 221' together. In order to limit the movement of the slide 181 one side wall 221' is shaped as is shown by dot and dash lines in Figs. 11 and 13 to form an abutment for said pins 180.

When the third cam 220 is angularly moved to position M, Fig. 41 (compare Fig. 14) the plate slide 181 is moved to the left by the roller 247 engaging the circular portion of said third cam 220. Thereby the ticket packing member 179 is moved to open the ticket receiving chamber of said tray 175. As is apparent from Fig. 41 the ticket packing member 179 is reset before the punching is finished.

After the punches are withdrawn from the ticket R' at point H' and the aliner 230 is disengaged at point I in Fig. 41 the ticket ejecting mechanism is operated to eject the punched ticket. It is to be noted that although Fig. 41 shows that the operation of a lever 248 (Fig. 17) to actuate said ticket ejecting mechanism starts at point C, the effective period is limited to an arc α adjacent the initial position O (Fig. 41). Said arc α is not positively determined but depends on a spring force (249) acting on said lever 248.

Said first cam 218 cooperates with an arm 248 (Figs. 17, 18) rotatably mounted about the upper left one of said bolts 222. As above mentioned the arm 248 is resiliently held in the position shown in Fig. 17 by a draw spring 249 having its one end anchored to one of the arms of said lever 248 and its other end to a stud 250 secured to the casing. The opposite arm of said lever 248 has an arcuate portion 251 the inner edge of which is circular with the pivot 222 as center so as to freely move while hooking over said second shaft 223. A roller 252 mounted on said first cam 218 is adapted to engage the end of said arcuate portion 251.

About said second shaft 223 a U-shaped lever 253 (Figs. 17, 18) is rockably mounted at its one bent portion. One branch 254 of said U-shaped lever is by means of a slot and pin connection 255 operatively connected with the operating members 139, 140 of the aforementioned feeler plate 128, so as to raise said plate 128 from the stationary bracket 127 when the arm 254 is turned counter clockwise.

The rocking movement of said U-shaped lever 253 is effected by a roller 258 mounted on said ticket ejector operating lever 248 (Figs. 17, 18) and adapted to engage a curved portion 257 on the opposite branch of said U-shaped lever 253, when said lever 248 is moved upwardly by the roller 252.

A link 260 (Figs. 17–20) connects at 261 and 262 respectively said lever 248 with the operating arm 167 of the ticket ejecting mechanism. In the inoperative position of the last mentioned arm 167, shown in Fig. 19, said bar 170 is maintained in active position for holding the feed rollers 154' spaced from the opposite roller 154 by engagement of the projection 174 with the stud 172 on said bar 170.

When the arm 167 is moved in clockwise direction by the lever 248 and the link 260, said bar 170 will remain in said active position (Fig. 19) during substantially the whole stroke of said arm 167. When said arm 167 approaches the end of its clockwise movement, the opposite projection 173 will move the bar 170 downwards out of engagement with the shafts of said feed rollers 154', thereby allowing said feed rollers 154, 154' to engage the ticket R by the force of said springs 157. At the return (counterclockwise) movement of the arm 167 effected by said draw spring 249 (Fig. 18) the pawl 168 engages the large gear 165 for rotating the feed rollers 154, 154' to eject the punched ticket. At the end of the return stroke the projection 174 engages the stud 172 and moves the bar 170 upwards. Thereby the tapered portions of said bar 170 move the feed rollers 154 apart to permit a new ticket to be inserted in said throat 106.

The roller 252 and the curved arm portion 251 are arranged so that the movement of said lever 248 begins already at point C (Fig. 41). However, due to the great angular movement of said first cam 218 which is necessary for bringing the lever 248 to its upper turning point at G (Fig. 41) the feed rollers 154, 154' are operated only when the punch tool has been nearly returned to its initial position H (Fig. 41). The ticket ejection movement is carried out during the period α (Fig. 41) as mentioned above.

In order to allow the ticket R to be fed out of the throat 106 the feeler plate 128 is raised from the surface of the bracket 127 during the ticket ejection period. Thereby the tubular pins 124 are permitted to freely move to the right in Figs. 17, 18. This movement of the feeler plate 128 is derived from the engagement between the roller 258 on the lever 248 and said curved portion 257 of the U-shaped lever 253. This engagement is obtained about the turning point of said lever 248 so that the tubular pins 124 are released immediately after the punching operation is carried out and during the ticket ejection period. As is shown in Fig. 41 the feeler plate 128 is disengaged from F to N. At the end of the machine operation the feeler plate 128 is returned to its position resting against the bracket 127 and due to the return movement of the starting bar 7 said feeler plate 128 is moved laterally so that its recesses are brought in register with said tubular pins 124.

After having been ejected from the throat 106 the punched ticket is caught by the hopper 153 and guided to the now emptied chamber in the ticket receptacle 175.

It is to be noted that by said arrangement the tickets lie in correct sequence in the receptacle and the ticket last punched is always readily accessible.

Figure 2:
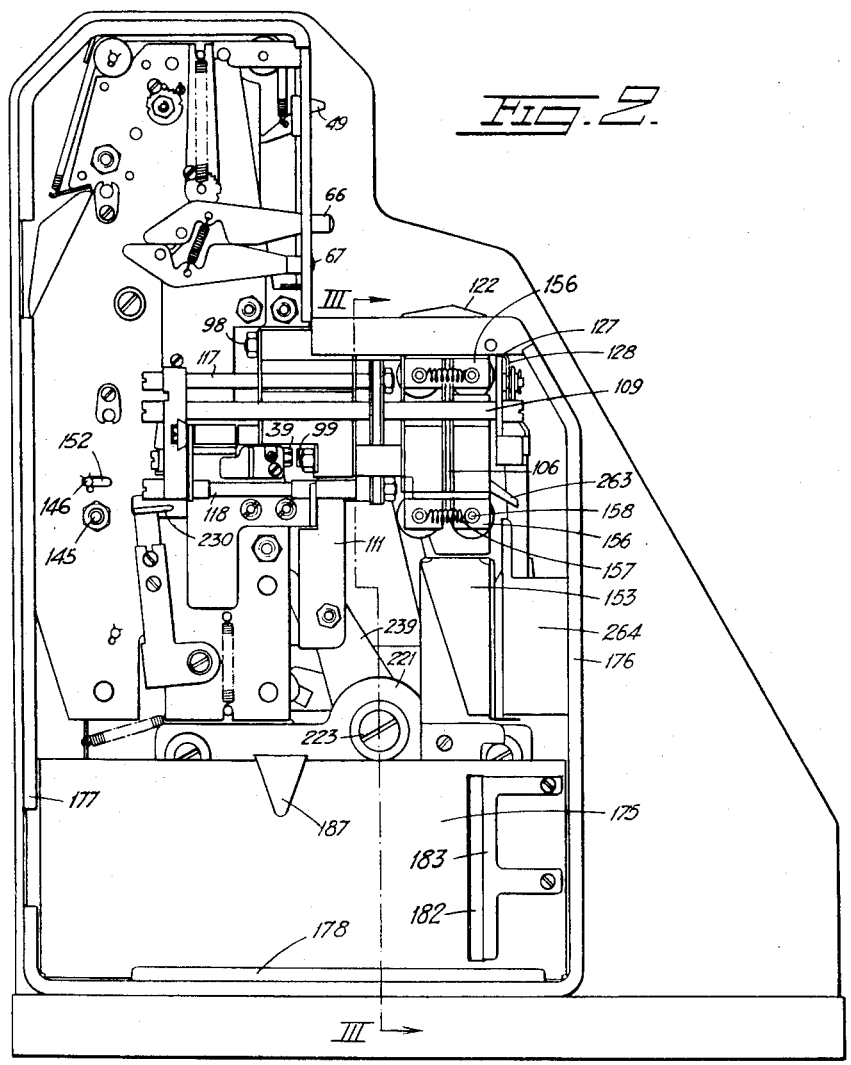
Fig. 2 is an elevational view of the machine observed from the left and having a cover plate of the casing removed.

Finally may be mentioned that the backing member 107 (Figs. 8, 10) has a pair of large apertures corresponding to the areas of said groups of punches. A small chute 263 (Fig. 2) is provided outside said apertures and serves to take up the punched waste material and guide the same to a receptacle 264 (Fig. 2).

As is mentioned above the ticket is adapted to be entirely inserted through the slot 121 of the bracket 122 so that the upper edge of the ticket is flush with the upper edges of said slot 121. Thereby, an inserted ticket may not be seized and removed by the fingers. This is the case even if the ticket is incorrectly inserted, for instance upside down. Then, the machine may not be started by the starting bar 7, due to the fact that some of the pins 124 do not sense registering holes 123, thereby preventing the feeler plate 128 and the starting bar 7 to be moved.

In order to effect a return movement of the ticket R a lever 265 is pivotally mounted on the backing member 107 and provided with a finger 266 (Fig. 23) adapted to engage the lower edge of the inserted ticket R. To allow said finger 266 to move a sufficient length upwardly the guide plate 97 has an arcuate slot 267 (Fig. 10).

The opposite end of said lever 265 is connected with a bell crank lever 269 by means of a draw coil spring. Said bell crank lever 269 is in turn connected through a linkage 270, 271, with the normal reset key K of the cash register.

When pushing down the reset key K the draw spring 268 will be subjected to a tension and swing the lever 265 upwards with its finger 266 engaging the ticket R, moving it above the bracket 122 so that it may be seized by the fingers and removed.

*Mode of operation*

The machine is operated as briefly described in the following: Assume that a "code record key" 39 having a figure combination characteristic for the cash register is inserted in said holder 40 and that the clerks have inserted their respective "code record keys" by aid of said slide 33. When using the cash register for instance at selling articles the clerk removes the ticket on the article sold and inserts said ticket into the slot 121. Then the keys in the respective banks 3–6 are pushed down in a predetermined sequence, such as from the left to the right, that means one of the clerk's keys 3, one of the keys in the transaction key bank 4, and the amount in the key banks 5. For adding the individual amounts the cash register 1 is started by pushing down the starting bar 7 and during the machine operation the data entered on the keyboard are transferred to the recording members of the cash register and simultaneously to the punch selecting bars 13, 13' operated by the machine followed by the punching operation and ejection of the punched ticket.

Thereafter possible further tickets are successively inserted while operating the cash register in the usual manner. At said mode of operation the disengagement member 204 is moved outside the path of the pawl 194, and therefore the punching is effected during each such mode of operation. During totaling of the machine by pushing down the key TL a ticket will not be punched.

By pushing down the key TL, the shaft 215 and the cam 216 secured thereto are angularly moved to a predetermined position, in which the cam 216 actuates the bar to move the disconnection member 204 into the path of said pawl 194. Thereby the connection between the main shaft 191 of the cash register and the main shaft 192 of the perforating mechanism is broken after having been angularly moved from O to A (Fig. 41) in which position said shaft 192 of the perforating mechanism is maintained by the roller 227 engaging the recess 226 in the lever 224 (Fig. 12). The cam 216 is suitably shaped to effect punching at resetting of the clerk's totalizers (depression of key Z) while no punching is effected at reading the clerk's totalizers (depression of key X) and reading the listing totalizers (starting, without depressing any amount key).

In the case the amount should be passed into a person's account, or other characteristic data should be punched on the ticket, the fingergrips 49 (Fig. 1) may be manually adjusted to any desired position in correspondence with the respective account number or the like. Thereby the punch selecting bars 20 are positioned. The cash register is then operated in the usual manner. It is to be noted in this connection that due to the angular position of the cam 90 a resetting of the manually operable punch selecting bars 20 may be automatically performed as described above.

From Fig. 41 it is apparent that the angular movement from K to L during which said resetting is carried out is the very last operation of the perforating mechanism.

The cam 90 (Figs. 33–35) is suitably shaped so that said resetting is not effected in adding operation but in total taking operation, so that the account number is maintained until the whole transaction is carried out. Suitably the following modes of operation do not effect the resetting of said manually operable selecting bars 20, namely reading the listing totalizers and adding.

It will be understood that while the mechanism herein shown and described can be applied with particular advantage to a cash register it is not restricted thereto. Moreover it is to be understood that it is not intended to confine the mechanism according to the invention to the one form of embodiment herein disclosed, since details of construction may be varied in several respects all coming within the scope of the following claims.

What is claimed is:

1. In a machine of the class described the combination with a cash register of a ticket perforating mechanism comprising in perforating members, means operable by the common manipulative means of the cash register to select the perforating members to be actuated, means cooperable with the driving means of the cash register and effective during a cash register operation to operate said perforating mechanism, ticket ejecting means operatively connected with said cooperable means for ejecting a perforated ticket at the end of the machine operation and a receptacle for successively receiving said tickets.

2. In a machine of the class described the combination with a cash register of a ticket perforating mechanism comprising in perforating members, means operable by the common manipulative means of the cash register to select the perforating members to be actuated, means cooperable with the driving means of the cash register and effective during cash register operation to operate said perforating mechanism, ticket ejecting means operatively connected with said cooperable means for ejecting a perforated ticket at the end of the machine operation into a receptacle, means for guiding the ejected ticket to a defined chamber of said receptacle, yielding lock means defining said chamber relative to the rest of the receptacle so that a ticket may only pass said lock means in one direction, and means in said receptacle reciprocable by said cooperable means at the beginning of a machine operation to move a ticket in said first mentioned chamber beyond said yielding lock means.

3. In a machine as claimed in claim 2 the further feature that the receptacle is provided with means actuated by the pile of tickets therein to control the operation of the starting means of the machine when the receptacle is filled to capacity.

4. In a machine of the class described the combination with a cash register, having a main shaft performing a rotating movement during a machine operation of the cash register, a second shaft angularly movable to definite positions in response to any of several modes of operation of the cash register and means effective during a machine operation to set data selected by the keys of the cash register, of a ticket perforating device; comprising perforating members, means cooperable with said data setting means to select the perforating members to be actuated, operating means of the perforating device to effect a perforating operation, clutch means normally connecting said main shaft and said operating means, clutch actuation means adapted to be moved in position to release said clutch means and control means actuated by said second shaft to adjust said control means in response to its angular position.

5. In a machine of the class described the combination with a cash register, having means for performing a movement during a machine operation of the cash register, means for selecting any of several modes of operation, means effective during a machine operation to set data selected by the keys of the cash register and means for starting the cash register to perform a machine operation, of a ticket perforating device; comprising perforating members, means cooperable with said data setting means for selecting the perforating members to be actuated, means selectively cooperable with said means movable during a machine operation for effecting a perforating operation of said perforating device, means cooperable with said mode of operation selecting means for controlling said selectively cooperable means, and means operatively connected with said starting means for controlling the starting of the cash register in response to the positions of the elements of the perforating device.

6. In a machine of the class described the combination with a cash register, having means for performing a movement during a machine operation of the cash register, means for selecting any of several modes of operation, means effective during a machine operation to set data selected by the keys of the cash register, and means for starting the cash register to perform a machine operation, of a ticket perforating device; comprising a plurality of punches, slide members movable between a plurality of positions and cooperable with said data setting means for selecting the punches to be actuated, one of said slide members supporting for each position an exchangeable punch selecting member for actuation of a plurality of rows of punches, means selectively cooperable with said means movable during a machine operation for effecting a perforating operation of said perforating device and means cooperable with said mode of operation selecting means for controlling said selectively cooperable means.

7. In a machine as claimed in claim 6 the further feature that means are provided to lock said one slide member when the cash register is at rest.

8. In a machine of the class described comprising a combination with a cash register of a perforating device having a slide member adjustable in response to the data set by a key bank of the cash register and supporting interchangeable punch selecting members, the arrangement of a horizontal slide movable between a first and a second position for inserting and removing respectively said interchangeable punch selecting members, while permitting said members to freely move vertically when said slide is in said first position.

9. In a machine as claimed in claim 8 the further feature that means connected with the starting means of the cash register are provided for locking said slide in inserted position during the machine operation and for preventing starting of the cash register when the slide is not in such position.

10. In a machine of the class described the combination with a cash register, having means for performing a movement during a machine operation of the cash register, means for selecting any of several modes of operation, means effective during a machine operation to set data selected by the keys of the cash register, of a ticket perforating device; comprising two sets of perforating members, means cooperable with said data setting means to select the perforating members of one of said sets to be actuated, members manually operable to select the perforating members of the other set of perforating members, means selectively cooperable with said means movable during a machine operation for effecting a perforating operation of said perforating device, and means cooperable with said mode of operation selecting means for controlling on one hand said selectively cooperable means and on the other hand means for resetting said manually operable selecting members.

11. In a machine of the class described the combination with a cash register, having a main shaft performing a movement during a machine operation of the cash register, a second shaft for selecting any of several modes of operation, means effective during a machine operation to set data selected by the keys of a cash register of a ticket perforating device; comprising two sets of perforating members, means cooperable with said data setting means to select the perforating members of one of said sets of perforating members to be actuated, members manually operable to select the perforating members of the other set of perforating members, means selectively cooperable with said main shaft during a machine operation for effecting a perforating operation of said perforating device, and means cooperable with said second shaft on one hand for controlling said selectively cooperable means and on the other hand for controlling means for resetting said manually operable selecting members, said reset means comprising a linkage including a lever having its pivot adjustable between an operative and an inoperative reset position by said second shaft.

12. In a machine as claimed in claim 11 the further feature that said second shaft is rotatable within only a part of a revolution and supports a cam having peripheral higher and lower portions for engaging said pivot.

13. In a machine as claimed in claim 12 the further feature that said cam has at least series of said higher and lower portions of different combinations said cam being adjustable so that any of said series will lie within the working region of said cam.

14. In a machine of the class described the combination with a cash register of a ticket perforating device comprising a ticket holder for receiving only one ticket at a time, said ticket having holes therein to be sensed by feeling members operatively connected with the starting means of said cash register, each of said feeling members comprising a pair of coaxial pins, one pin secured to a movable perforating member and having a conical tip extending partially within said ticket holder so as to leave a space between the tip and the wall of the ticket holder for the passage of a ticket therebetween, and the other pin being spring biased in engagement with said first pin has a head with a central cavity receiving a portion of the conical tip of said first pin, said head having a conical shape forming with the conical tip of the first pin a wedge-like nip.

15. In a machine of the class described the combination with a cash register of a perforating device having a ticket holder adapted to receive one ticket at a time, feeler means adapted to feel perforations in the ticket, said feeler means comprising a plate, means slidable on a surface of said plate to move between two positions, pins adapted to engage perforations in said ticket and movably mounted in said plate perpendicularly to the surface thereof, said pins being constructed to project from said surface when engaging an unperforated portion of the ticket preventing said slidable means to be moved from said one to said other position and means connecting said slidable means with the starting means of said machine.

16. In a machine of the class described, the combination with a cash register having a first set of axially spaced coaxial gears operated in response to data selected by the keys of the cash register, of a ticket perforating device including a set of punch selecting members, a second set of coaxial gears each drivingly connected to one of said punch selecting members for adjusting the position thereof, said second set of gears having its axis parallel with said first set of gears and being axially spaced therefrom, a set of shafts each having an individual axis that is spaced from the axis of the remainder of said shafts and is parallel to the axes of said first and second sets of gears, said set of shafts extending over said first and second sets of gears, each shaft having a pair of rigidly connected gears, one gear of each pair meshing with a selected gear of one set and the other gear of the same pair meshing with a selected gear of the other set.

References Cited in the file of this patent

UNITED STATES PATENTS

| Re. 20,746 | Kurowski et al. | May 31, 1938 |
| 1,388,299 | Powers | Aug. 23, 1921 |
| 1,439,184 | Meyer | Dec. 19, 1922 |
| 1,657,712 | Goldberg | Jan. 31, 1928 |
| 1,812,620 | Braitmayer | June 30, 1931 |
| 2,046,082 | Mills | June 30, 1936 |
| 2,064,340 | Davis | Dec. 15, 1936 |
| 2,255,011 | Lake et al. | Sept. 2, 1941 |
| 2,304,854 | Shields et al. | Dec. 15, 1942 |
| 2,768,691 | Cooper et al. | Oct. 30, 1956 |